(12) United States Patent
Konno et al.

(10) Patent No.: US 7,339,383 B2
(45) Date of Patent: Mar. 4, 2008

(54) NANOGRIPPER DEVICE HAVING LENGTH MEASURING FUNCTION AND METHOD FOR LENGTH MEASUREMENT EXECUTED WITH NANOGRIPPER DEVICE HAVING LENGTH MEASURING FUNCTION

(75) Inventors: Takashi Konno, Takamatsu (JP); Hiroki Hayashi, Takamatau (JP); Toshihide Tani, Takamatsu (JP); Masamichi Oi, Chiba (JP); Masanao Munekane, Chiba (JP); Koji Iwasaki, Chiba (JP)

(73) Assignees: AOI Electronics Co., Ltd., Takamatsu-shi (JP); SII Nano Technology Inc., Chiba-shi (JP)

( * ) Notice: Subject to any disclaimer, the term of this patent is extended or adjusted under 35 U.S.C. 154(b) by 0 days.

(21) Appl. No.: 11/180,605

(22) Filed: Jul. 14, 2005

(65) Prior Publication Data
US 2006/0220659 A1    Oct. 5, 2006

(30) Foreign Application Priority Data
Jul. 16, 2004    (JP) .............................. 2004-210567

(51) Int. Cl.
*G01R 27/26*    (2006.01)
*G01N 19/02*    (2006.01)
*G01M 19/00*    (2006.01)
*B66C 1/42*    (2006.01)

(52) U.S. Cl. ........................ 324/662; 73/104; 73/865.8; 294/86.4

(58) Field of Classification Search .................... None
See application file for complete search history.

(56) References Cited

U.S. PATENT DOCUMENTS

| 5,222,778 | A * | 6/1993 | Moench .................... 294/86.4 |
| 5,727,915 | A * | 3/1998 | Suzuki ......................... 414/1 |
| 6,590,212 | B1* | 7/2003 | Joseph et al. ............... 250/311 |
| 7,075,772 | B2* | 7/2006 | Heiland ...................... 361/234 |
| 2005/0029827 | A1* | 2/2005 | Hashiguchi et al. ....... 294/86.4 |
| 2006/0010968 | A1* | 1/2006 | Munekane et al. ........... 73/104 |

FOREIGN PATENT DOCUMENTS

| JP | 07-052072 A | 2/1995 |
| JP | 10-337049 A | 12/1998 |
| JP | 11-346482 A | 12/1999 |
| JP | 3109220 B2 | 9/2000 |

* cited by examiner

*Primary Examiner*—Andrew H. Hirshfeld
*Assistant Examiner*—Jeff Natalini
(74) *Attorney, Agent, or Firm*—Crowell & Moring LLP

(57) ABSTRACT

A fixed electrode and a movable electrode used to drive each arm are disposed at a drive unit. As a voltage is applied between the fixed electrode and the movable the electrode, a coulomb force causes the movable the electrode to move, thereby driving the arms along the closing direction. The dimensions of a sample can be measured based upon the electrostatic capacity achieved between the electrodes when the sample becomes gripped by the arms.

20 Claims, 26 Drawing Sheets

| counter value | dimensional value |
|---|---|
| 0 | 10 μm |
| 1 | 9.9 μm |
| 2 | 9.8 μm |
|  |  |
| 15 | 8.5 μm |
| 16 | 8.4 μm |

NANOGRIPPER DEVICE HAVING LENGTH MEASURING FUNCTION AND METHOD FOR LENGTH MEASUREMENT EXECUTED WITH NANOGRIPPER DEVICE HAVING LENGTH MEASURING FUNCTION

BACKGROUND OF THE INVENTION

1. Field of the Invention

The present invention relates to a nanogripper device having a length measuring function, which is capable of handling ultrasmall machines and is also capable of measuring dimensions of the ultrasmall machines, and a method for length measurement executed by a nanogripper device having a length measuring function.

2. Description of Related Art

The robust progress in micro-machining technologies achieved by adopting semiconductor processing technologies has invigorated interest in research and development of ultrasmall machines. Ultrasmall machines on the order of microns are handled by using ultrasmall pincettes (hereafter referred to as nanogrippers) (see Japanese Laid Open Patent Publication No. H7-52072). Various types of actuators such as electrostatic actuators, thermal actuators and piezoelectric actuators have been proposed to be used to open/close nanogrippers.

For instance, electrostatic actuators in the related art include an actuator that employs a comb-shaped electrode. This actuator opens/closes the arms as the voltage applied to the electrode is controlled. In addition, in the device disclosed in the publication quoted above, an actuator that engages in reciprocal movement is used to open/close the arms incrementally in predetermined steps.

SUMMARY OF THE INVENTION

There are no instruments in the related art capable of easily measuring the dimensions of micron-order samples or the dimensions of various members each constituted with an ultrasmall member such as a micro-mechanism. Nanogrippers in the related art, which are used simply to grasp and carry a sample, are not capable of measuring the size of the sample.

It would be desirable to provide a nanogripper device having a length measuring function which includes a pair of arms that is opened and closed freely, an electrostatic actuator that drives the pair of arms to open/close the arms, a hold detection unit that detects that a sample has become gripped, a physical quantity detection unit that detects at least one physical quantity, either an electrostatic capacity achieved when the sample is gripped or a voltage applied to the electrostatic actuator when the sample is gripped, as the hold detection unit detects that the sample has become gripped, and a dimension calculation unit that calculates dimensions of the sample based upon the physical quantity detected by the physical quantity detection unit.

It would be desirable to provide a method of length measurement executed with a nanogripper device having a length measuring function and having a pair of arms that can be opened and closed freely and an electrostatic actuator that drives the pair of arms to open/close the arms, including steps for detecting that a sample has become gripped, detecting at least one physical quantity, either an electrostatic capacity achieved when the sample has become gripped or a voltage applied to the electrostatic actuator when the sample has become gripped, upon detecting that the sample has become detected, and calculating dimensions of the sample based upon the detected physical quantity.

DETAILED DESCRIPTION OF PREFERRED EMBODIMENT

Figure 1:
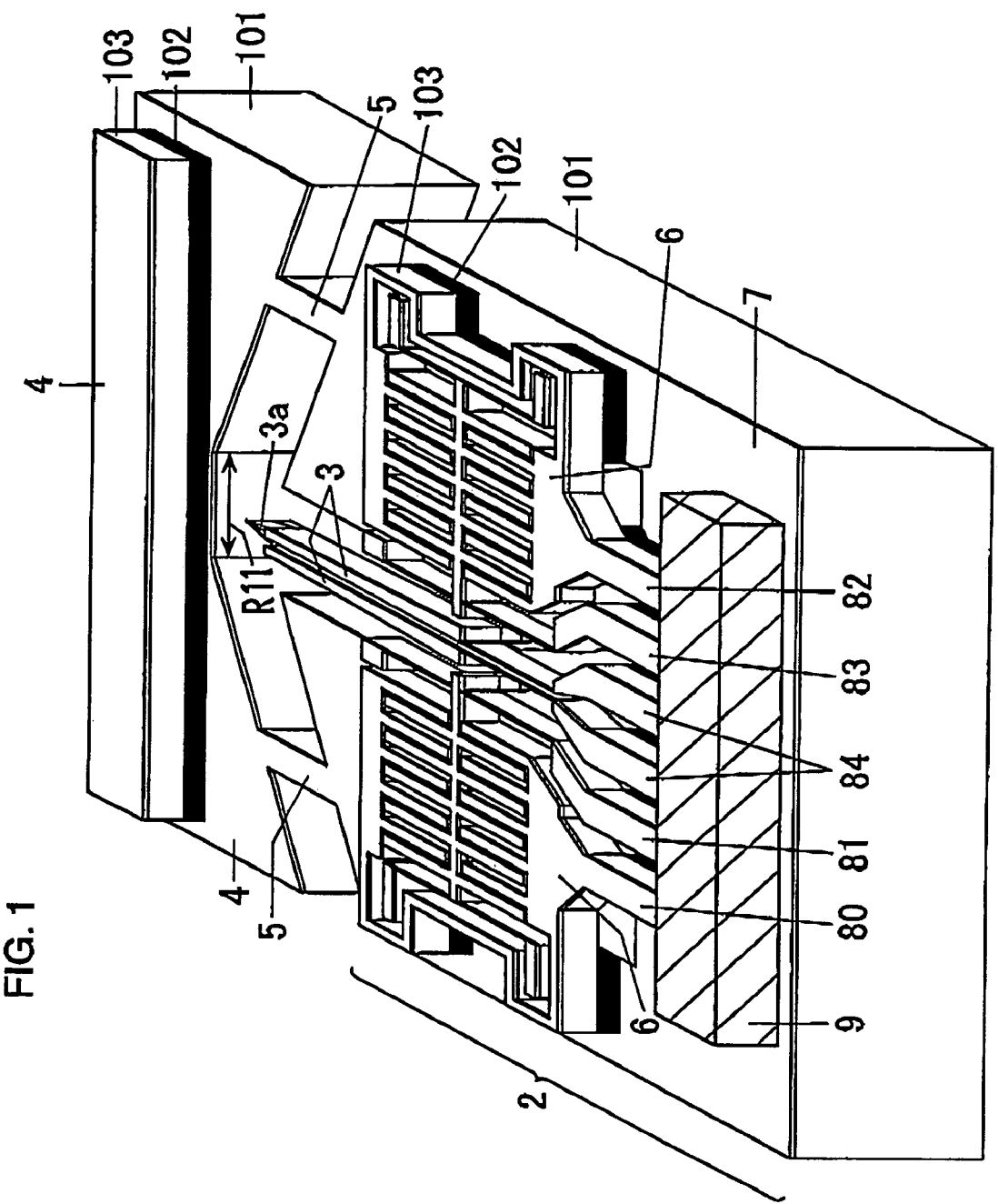
FIG. 1 is a perspective schematically showing the structure adopted in the nanogripper device in an embodiment.

FIG. 1 is a perspective schematically showing the structure of a nanogripper device 2 having a length measuring function in an embodiment. The nanogripper device 2 in FIG. 1 is formed on a semiconductor substrate by adopting a micro-machining technology achieved through the semiconductor processing technology. A guard 4 is disposed via a link portion 5 in order to protect arms 3 of the nanogripper device 2.

When the nanogripper device 2 is to be used in operation, the guard 4 is snapped off the nanogripper device 2 at the link portion 5. The arms 3 are caused to open/close along the horizontal direction on the drawing sheet surface, as indicated by an arrow R11 by a drive unit 6. A micron-order sample is gripped with grip portions 3a formed at the front ends of the arms 3.

As explained later, detection circuits and an arithmetic operation circuit are formed in a circuit unit 9. As described later, the nanogripper device 2 is formed on a silicon substrate by adopting semiconductor processing technology.

Figure 2:
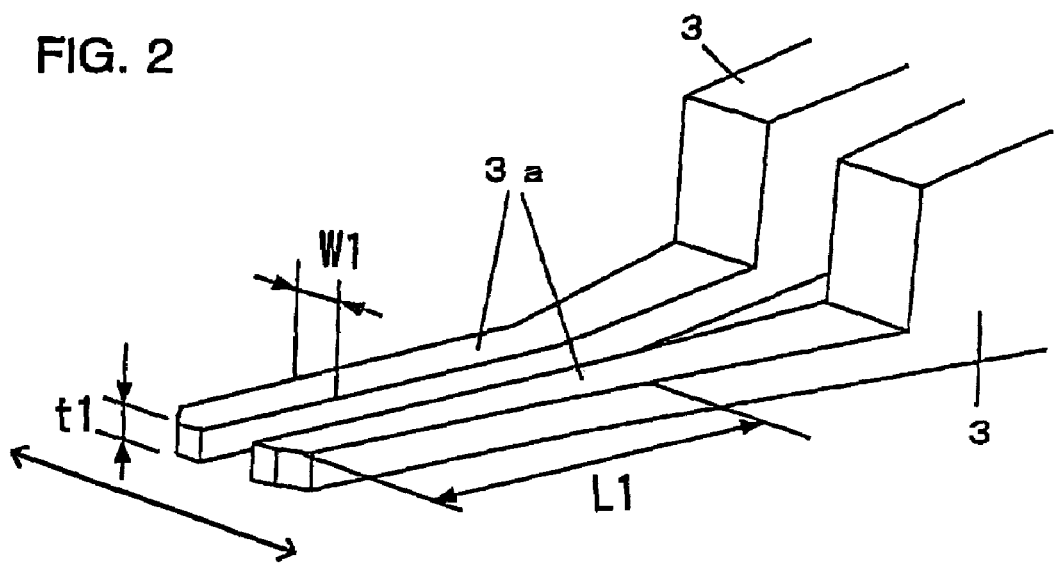
FIG. 2 is a detailed enlargement of the grip portions.

FIG. 2 is a detailed enlargement of the grip portions 3a. The grip portions 3a are each formed by reducing the thickness of the front end portion of the arm 3 in stages. The width W1 and the thickness t1 of the grip portions 3a used to grip a micron-order sample are set so as to achieve dimensions substantially equal to those of the sample, with W1 set to, for instance, 1 to 30 μm and t1 set to, for instance, 1 to 25 μm. Since the gripping operation by the arms 3 is executed within the visual field of the microscope, the length L1 of the grip portions 3a is set to approximately 100 μm, slightly greater than the length of the sample to facilitate observation of the sample and provide easy access to the sample. The grip portions 3a are each formed by grinding off the upper surface side of each arm 3 in a stage. Since the arms 3 grip the sample placed on a flat stage under normal circumstances, the lower surfaces of the arms 3 are flat.

Figure 3:
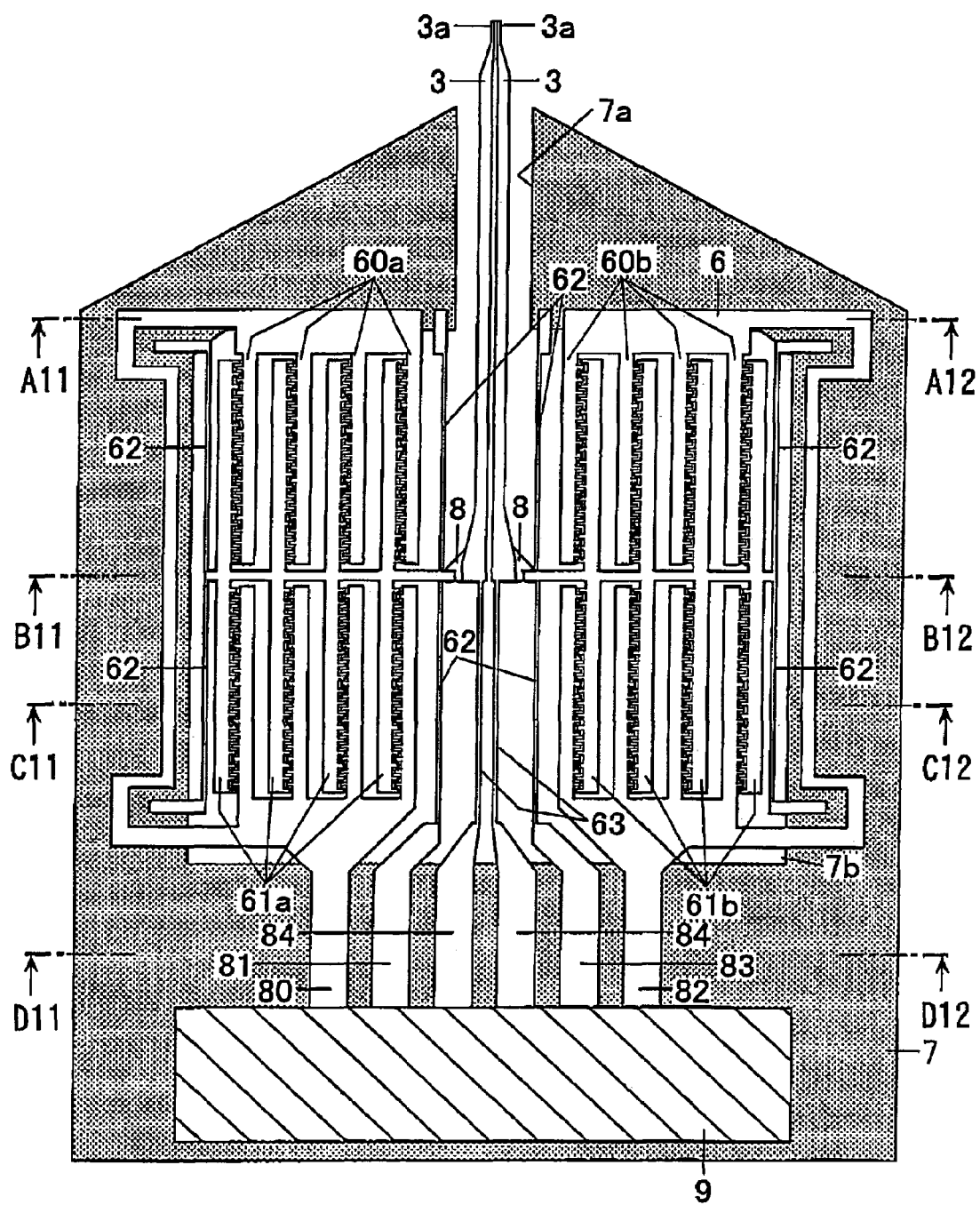
FIG. 3 is a detailed plan view of the gripper main unit.

FIG. 3 is a detailed plan view of the nanogripper device 2. The nanogripper device 2 is mounted on a carrier mechanism such as an XYZ stage prior to use. After the nanogripper device 2 is mounted at the carrier mechanism, the guard 4 is disengaged from the nanogripper device 2 by bending the link portion 5, thereby readying the nanogripper 2 for use.

As shown in FIG. 3, the drive unit 6 formed on a base body 7 constitutes an electrostatic actuator and includes a fixed electrode 60a and a movable electrode 61a used to drive the left side arm 3 and a fixed electrode 60b and a movable electrode 61b used to drive the right side arm 3. The fixed electrodes 60a and 60b and the movable electrodes 61a and 61b extend along the vertical direction in FIG. 3, with the surfaces of the fixed electrode 60a and the movable electrode 61a and the surfaces of the fixed electrode 60b and the movable electrode 61b facing opposite each other each assume the shape of comb teeth. The movable electrodes 61a and 61b are each elastically fixed onto the base body 7 via a support unit 62.

As a voltage is applied between an electrode terminal 80 of the fixed electrode 60a and an electrode terminal 81 of the movable electrode 61a, a coulomb force causes the movable electrode 61a to move to the right in FIG. 3. As a voltage is applied between an electrode terminal 82 of the fixed electrode 60b and an electrode terminal 83 of the movable electrode 61b, the movable electrode 61b is caused to move to the left in FIG. 3.

The arms 3 are each elastically fixed onto the base body 7 by a support unit 63. An electrode terminal 84 is connected to each arm 3 via the support unit 63. The left side arm 3 is linked to the left-side movable electrode 61a through a linking member 8 disposed at the bottom of the arm 3. Likewise, the right side arm 3 is linked to the right side movable electrode 61b through a linking member 8.

Figure 4:
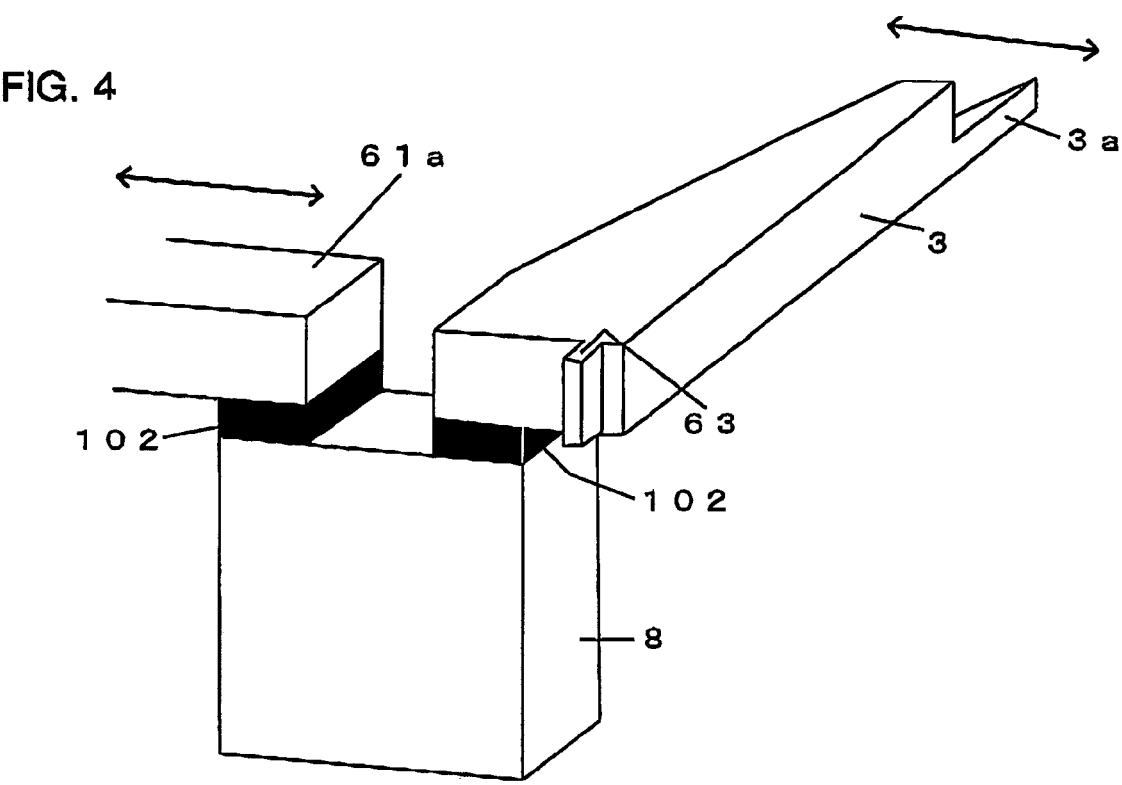
FIG. 4 shows the area over which an arm and a movable electrode are connected with each other.

FIG. 4 is an enlargement of the area over which the arm 3 is linked with the movable electrode 61a. The arm 3 is linked to the movable electrode Gla via the linking member 8. It is to be noted that an insulating layer 102 is formed between the arm 3 and the linking member 8 and between the movable electrode 61a and the linking member 8. As the movable electrode 61a is caused to move by the coulomb force to the right in the figure, the arm 3, too, moves to the right in synchronization with the movement of the movable electrode.

An identical structure is assumed with regard to the right side arm 3, the fixed electrode 60b and the movable electrode 61b in FIG. 3, except that the left/right orientation is reversed. Thus, as a difference is induced between the potential at the electrode 60b and the potential at the electrode 61b by applying voltages to the electrode terminals 82 and 83, the right side arm 3 moves to the left in the figure. As a result, the left and right arms 3 close and the sample is gripped with the grip portions 3a.

As shown in FIG. 3, a groove-like through-hole 7a is formed in the base body 7 over the area where the arms 3 are disposed and a rectangular through-hole 7b is formed at the base body 7 over the area where the drive unit 6 is disposed. The arms 3 and the drive unit 6 respectively bridge and are supported over the through-holes 7a and 7b.

Figure 5:
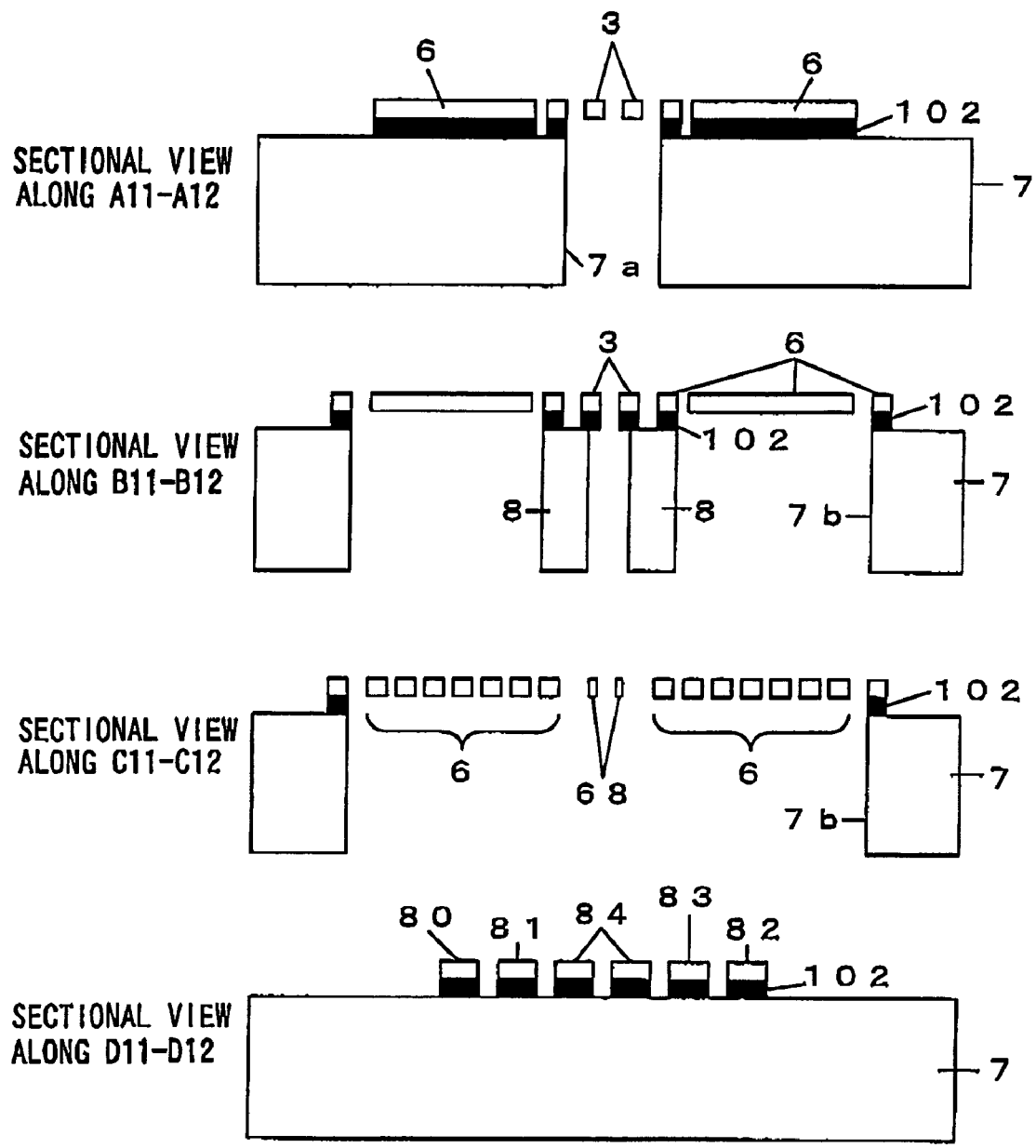
FIG. 5 presents sectional views taken along A11-A12, B11-B12, C11-C12 and D11-D12 in FIG. 3.

FIG. 5 illustrates the shapes of various sections of the nanogripper device 2, in sectional views taken along A11-A12, B11-B12, C11-C12 and D11-D12 in FIG. 3. As shown in the sectional view taken along A11-A12, the through-hole 7a is formed under the arms 3. The drive unit 6 is formed on the base body 7 via the insulating layer 102. Likewise, the arms 3 and the drive unit 6 (the movable electrodes 61a and 61b) linked via the linking members 8, too, are formed on the base body 7 via the insulating layer 102. The sectional view taken along D11-D12 shows an area where the electrode terminals 80 to 84 in FIG. 3 are present. The electrode terminals 80 to 84, too, are formed on the base body 7 via the insulating layer 102.

As described above, the nanogripper device 2 is formed on a substrate assuming a three-layer structure which includes two silicon layers sandwiching an insulating layer, e.g., an SOI (silicon on insulator) substrate. The arms 3, the drive unit 6 and the electrode terminals 80 to 84 are all formed from a single silicon layer. It is to be noted that the method for manufacturing the nanogripper device 2 is to be detailed later.

<<Operation>>

Figure 6:
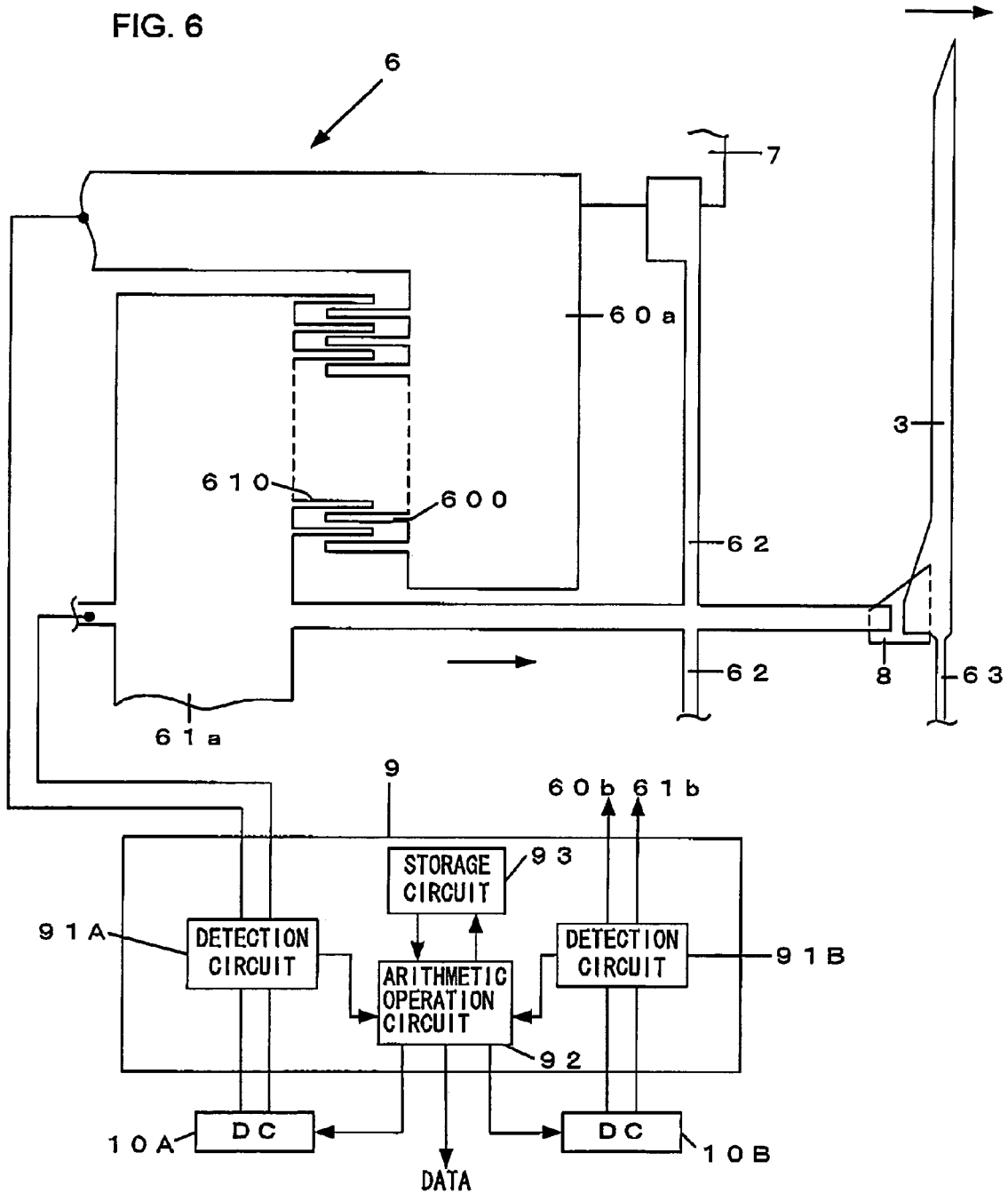
FIG. 6 illustrates the operation of the nanogripper device.

FIG. 6 is a block diagram of the internal structure adopted in the circuit unit 9 that controls the drive unit 6. FIG. 6 only includes a partial illustration of the drive unit 6, i.e., part of the fixed electrode 60a and the movable electrode 61a used to drive the left side arm 3. The electrodes 60a and 61a constitute an electrostatic actuator. By applying a voltage to the electrode terminals 80 and 81 in FIG. 3, the movable electrode 61a is driven. As explained earlier, the movable electrode 61a is elastically fixed to the base body 7 via the support unit 62.

The circuit unit 9 includes a detection circuit 91A, a detection circuit 91B, an arithmetic operation circuit 92 and a storage circuit 93. An external DC source 10A is connected to the electrodes 60a and 61a via the detection circuit 91A, whereas a DC source 10B is connected to the electrodes 60b and 61b via the detection circuit 91B.

As explained later, the detection circuit 91A detects the electrostatic capacity between the electrodes 60a and 61a, and the detection circuit 91B detects the electrostatic capacity between the electrodes 60b and 61b. The arithmetic operation circuit 92 calculates the distance between the arms 3 and the level of the gripping force achieved with the arms 3 based upon the electrostatic capacities detected with the individual detection circuits 91A and 91B. Data needed in the arithmetic operations executed at the arithmetic operation circuit 92 are stored in the storage circuit 93. In addition, the arithmetic operation circuit 92 outputs control signals based upon which the voltages output from the DC sources 10A and 10B are controlled. This structure enables independent control of the left side arm 3 and the right side arm 3.

In the embodiment, the portions of the fixed electrode 60a and the movable electrode 61a facing opposite each other are formed in the shape of comb teeth. Thus, the electrodes can be disposed close to each other, and it is possible to assure ample range of movement while maintaining a narrow gap between the electrodes. This allows the drive voltage to be lowered. In addition, since the upward force and the downward force acting symmetrically along the vertical direction cancel each other out, only the horizontal force is applied to the movable electrode 61a. In contrast, if the fixed electrode 60a and the movable electrode 61a are respectively a simple plane parallel plate, a sufficient level of coulomb force can be obtained only when the gap between the electrodes is narrow, and the coulomb force becomes weaker as the range of movement increases and the gap becomes greater, in which case, a higher voltage is required. Comb teeth 600 formed at the fixed electrode 60a and comb teeth 610 formed at the movable electrode 61a alternately project toward the opposite electrodes. A satisfactory level of drive force can be obtained by setting the gap between the electrodes 60a and 61a in the order of 1 to several μm.

In a specific example of the dimensions that may be set for the comb teeth 600 and 610, the distance between the electrodes 60a and 61a changes within a range of 18 μm to 28 μm when the arm 3 opens/closes over a 10 μm width, the comb teeth 600 and 610 each have a width of 3 μm, the gap between the comb teeth 600 and 610 ranging along the vertical direction in the figure is 3 μm and the length of the comb teeth 600 and 610 is set to 15 μm. In principle, the arm 3 can be made to open/close over a distance of up to several tens of μm.

For instance, if the positive side of the DC source 10A is connected to the fixed electrode 60a and the negative side of the DC source 10A is connected to the movable electrode 61a, the fixed electrode 60a is charged with positive electricity and the movable electrode 61a is charged with negative electricity. Then, an attracting force is induced between the electrodes 60a and 61a due to the coulomb force caused by the negative charge and the positive charge, and the movable electrode 61a moves to the right in the figure against the elastic force of the support unit 62. As a result, the left side arm 3 is driven to the right in the figure. The operation of the right side arm 3 is identical to the operation of the left side arm 3, except that the left/right orientation is reversed. Namely, as a voltage is applied to the electrodes 60b and 61b, the right side arm 3 is driven to the left in the figure. The pair of arms 3 is thus closed.

Figure 7:
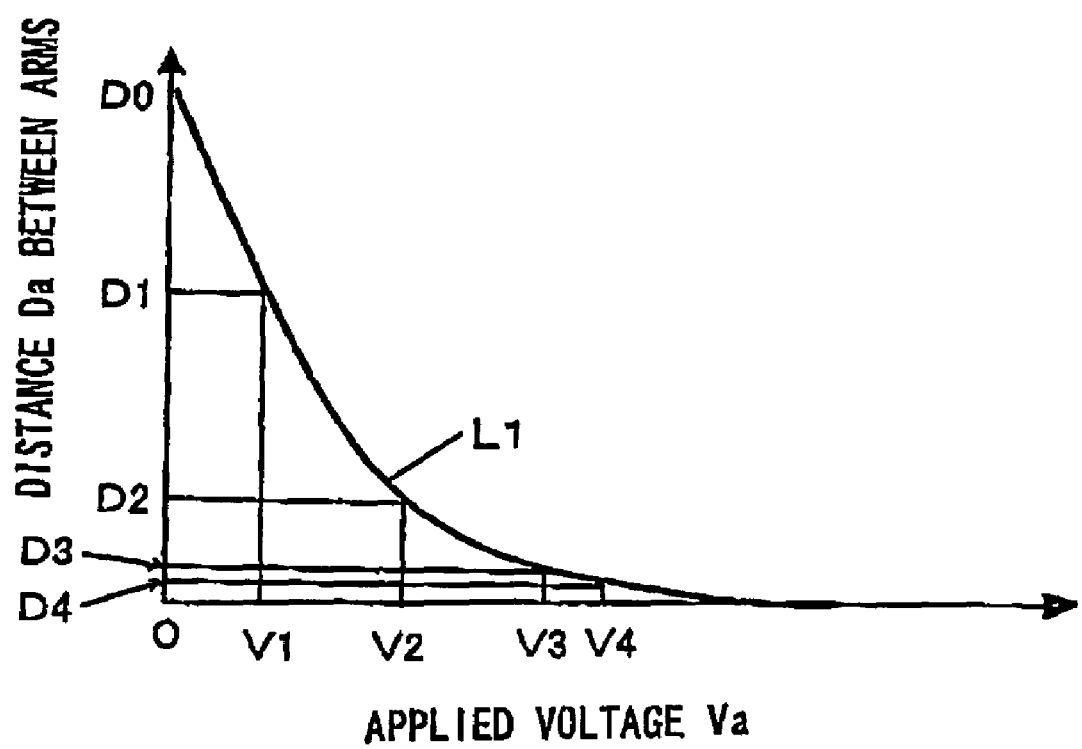
FIG. 7 shows the qualitative relationship between the applied voltage and the distance between the arms.
Figures 27, 28:
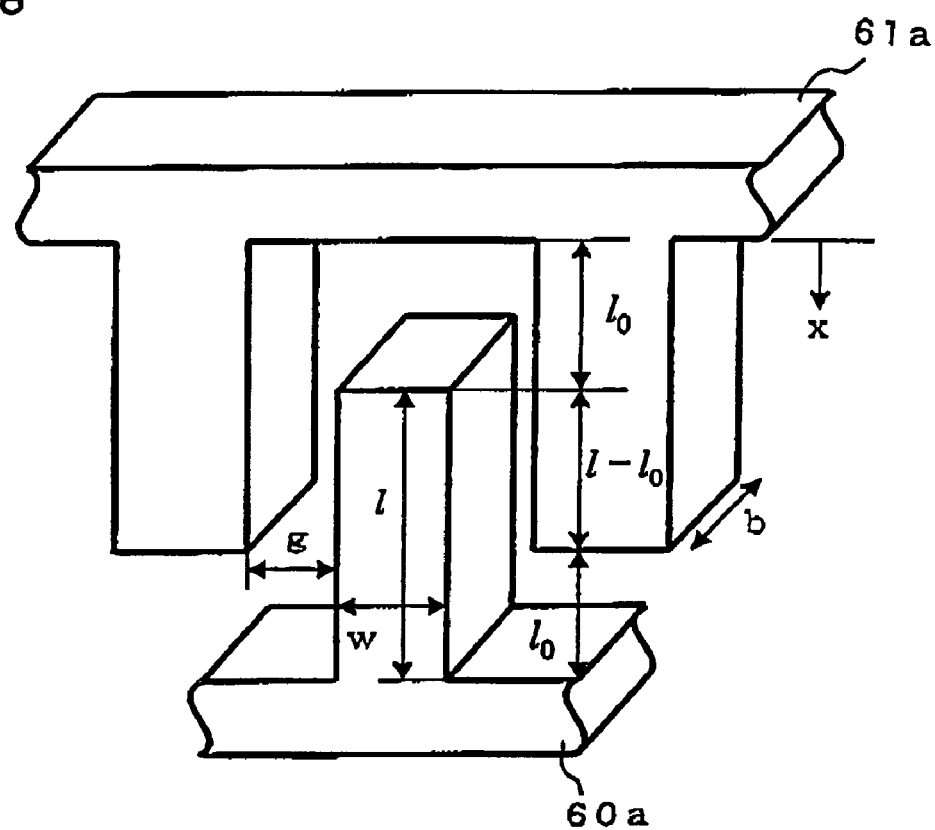
FIG. 27 shows the relationship between the count value and the distance between the arms.
FIG. 28 shows the dimensions assumed at the comb tooth portions of the electrodes.

FIG. 7 shows the qualitative relationship between the voltage Va applied to the electrodes 60a and 61a and the distance Da between the arms 3. D0 represents the distance between the arms 3 in an initial state in which the voltage Va is equal to 0. With the dimensions of the comb tooth portions at the electrodes 60a and 61a set as shown in FIG. 27, the electrostatic capacity $C_{comb}(x)$ can be expressed as in expression (1) below as a function of the range of movement x over which the movable electrode 61a moves. It is to be noted that $\varepsilon_0$, w, $l_0$, l, g, b, Va and N in expression (1) respectively represent the vacuum dielectric constant, the width of each comb tooth, the initial distance between the tips of the comb teeth and the wall surface of the opposite electrode, the length of the comb teeth, the gap between the individual comb teeth, the thickness of the comb teeth, the applied voltage and the number of comb teeth.

$$F_{comb}(X) = \frac{d}{dx}\left(\frac{1}{2}C_{comb}(X)V^2\right) \tag{1}$$

Since the energy stored between the electrodes 60a and 61a is expressed in $\{C_{comb}(x) V^2/2$ (joules)$\}$, the coulomb force $F_{comb}(x)$ induced between the electrodes 60a and 61a can be expressed in (2) below.

$$\begin{aligned}F_{comb}(X) &= \frac{d}{dx}\left(\frac{1}{2}C_{comb}(X)V^2\right)\\ &= \varepsilon_0 bNV^2\left(\frac{1}{2g} + \frac{w}{2(l_0-x)^2}\right)\end{aligned} \tag{2}$$

Since the movable electrode 61a and the arm 3 are elastically supported via the support units 62 and 63 respectively, the movable electrode 61a moves to a position at which the coulomb force $F_{comb}$ (x) expressed in (2) is in balance with the elastic force resulting from the deformation occurring at the support units 62 and 63 in response to the application of the voltage Va. Namely, the distance Da between the arms 3 changes as indicated with the curve L1 in FIG. 7 in correspondence to the level of the applied voltage Va.

Figure 8A:
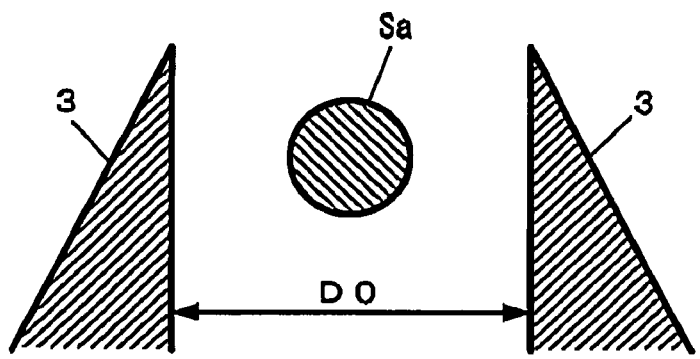
FIGS. 8A to 8D each show the positional relationship between the sample and the arms during the gripping operation.
Figure 8B:
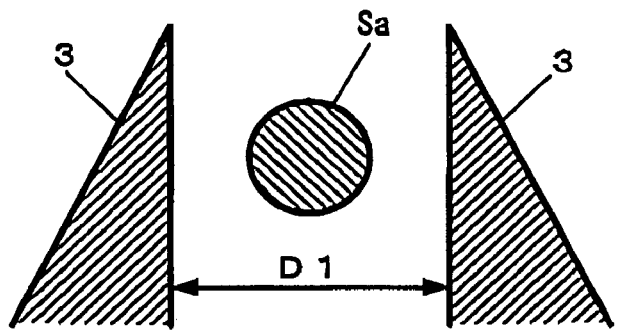
Figure 8C:
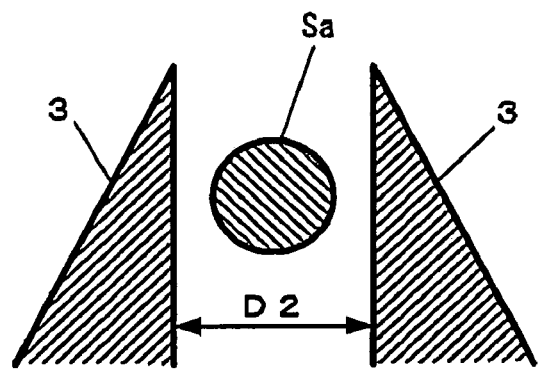

In order to grip the sample with the arms 3, the gripper main unit 2 is moved by the carrier mechanism so as to position the sample Sa between the arms 3 as shown in FIG. 8A. Subsequently, as the applied voltage Va is increased to V1 and then to V2, the distance between the arms 3 decreases to D1 and then to D2, as shown in FIGS. 8B and 8C respectively. Then, as the level of the applied voltage reaches V3 and the distance between the arms is D3, the arms 3 come in contact with the sample Sa and the sample Sa becomes gripped by the arms.

(Sample Hold Detection)

Figure 9:
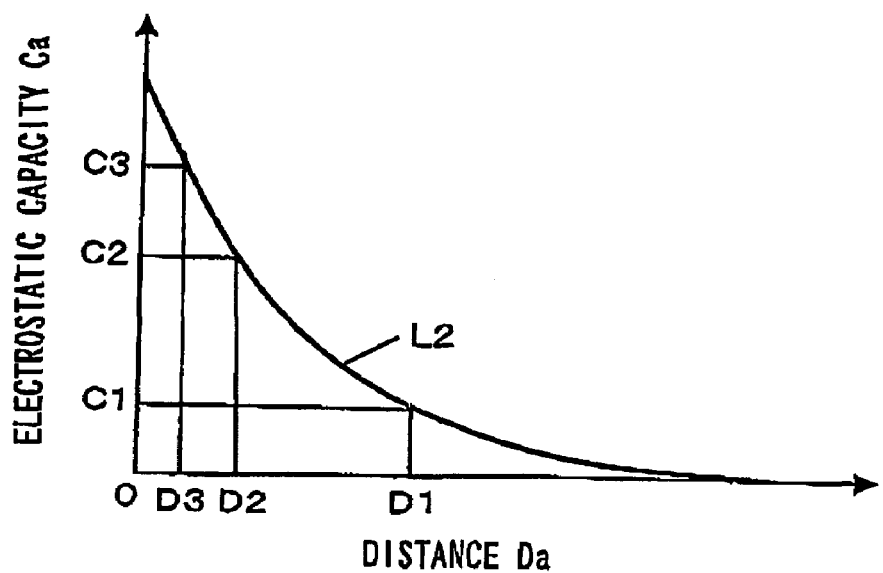
FIG. 9 shows the relationship between the distance between arms and the electrostatic capacity.
Figure 10:
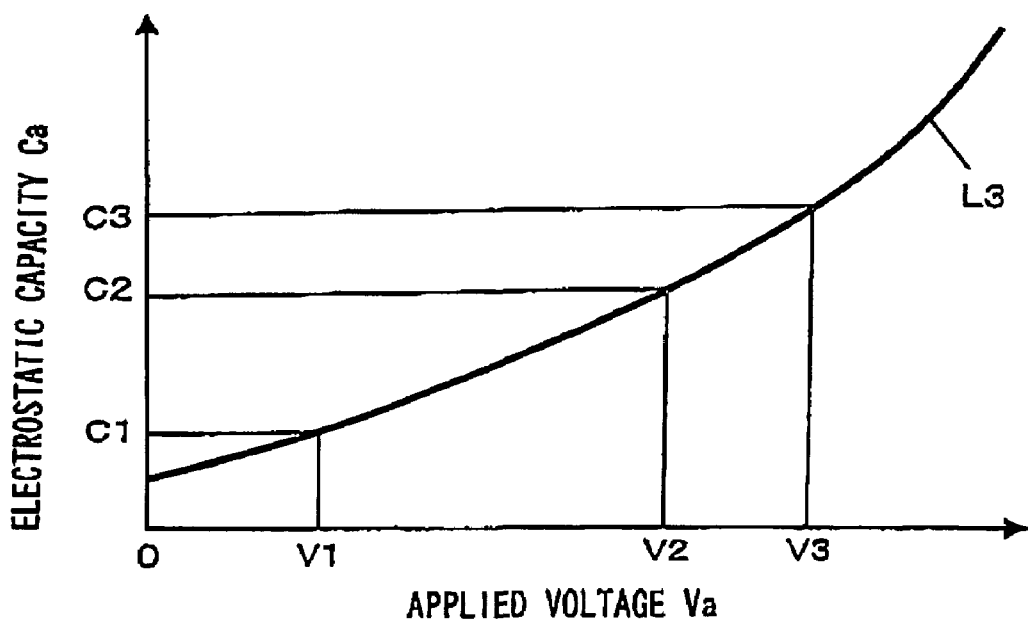
FIG. 10 shows the relationship between the applied voltage and the electrostatic capacity.

The electrostatic capacity $C_{comb}(x)$ at the electrodes 60a and 61a is expressed as in (1) above. If the range of movement x in expression (1) for the electrostatic capacity $C_{comb}(x)$ is substituted with the distance Da between the arms 3, the electrostatic capacity Ca changes roughly as indicated by the curve L2 in FIG. 9. As the distance is reduced to D1, to D2 and then to D3, the electrostatic capacity Ca increases to C1, to C2 and then to C3. Since the electrostatic capacity Ca increases when the arms 3 are closed by raising the applied voltage Va, a relationship such as that indicated with the curve L3 in FIG. 10 exists between the applied voltage Va and the electrostatic capacity Ca. Namely, as the voltage Va is applied, the distance Da between the arms 3 and the electrostatic capacity Ca between the electrodes 60a and 61a are determined in correspondence to the level of the voltage Va.

Figure 8D:
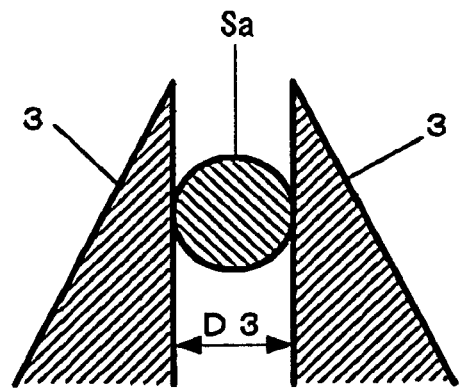

When the level of the applied voltage reaches V3, the arms 3 contact the sample Sa as shown in FIG. 8D. Assuming that the sample Sa is a rigid substance, the arms 3 will not be allowed to move further along the closing direction and thus the distance Da remains unchanged even if the level of the applied voltage Va is further raised after the arms 3 grip the sample Sa. Thus, the electrostatic capacity Ca assumes a constant value C3 as indicated by the dotted line L4 in FIG. 11.

If, on the other hand, the sample is a deformable sample such as a biological sample, the contact pressure of the arms 3 causes deformation of the sample as the applied voltage Va increases beyond V3 and the gripping force further increases. Under such circumstances, the electrostatic capacity increases slightly above C3, as indicated by the curve L5 in FIG. 11. In either case, a detection can be executed to ascertain whether or not the sample Sa has been gripped with the arms 3 by detecting a point of inflection P at which the curve L3 changes to the curve L4 or the curve L5.

(Methods for Detecting Electrostatic Capacity Ca)

Figure 12A:
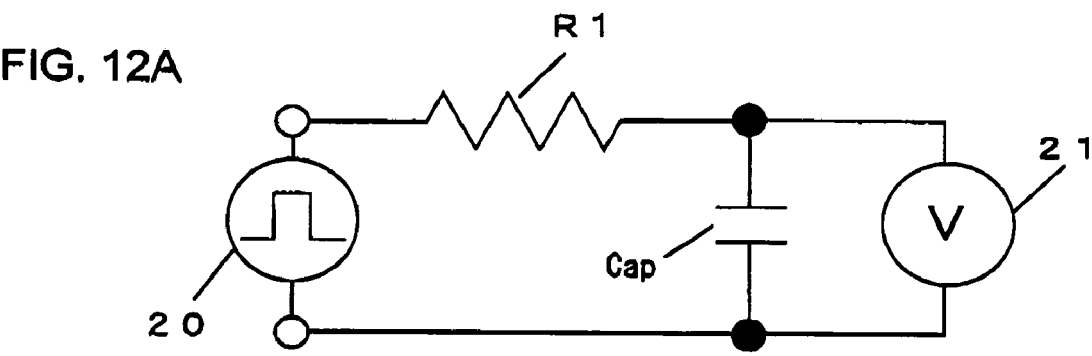
FIGS. 12A to 12C illustrate a method that may be adopted to determine the electrostatic capacity in correspondence to a time constant, with FIG. 12A showing the detection circuit, FIG. 12B showing the input voltage waveform Vin and FIG. 12C showing the observed voltage waveform Vout.
Figure 12B:
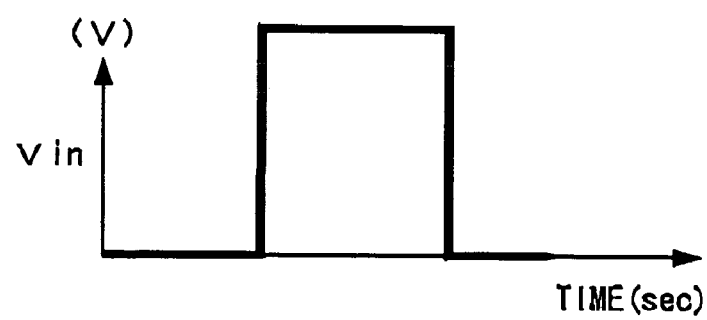

Next, methods that may be adopted when detecting the electrostatic capacity Ca at a detection unit 623 are explained. In the following explanation, a method through which the electrostatic capacity is detected based upon a time constant and a method through which the electrostatic capacity is detected based upon an oscillation frequency are described. First, the method through which the electrostatic capacity Ca is determined based upon a time constant is explained. FIG. 12A shows a detection circuit, with C indicating a capacitor formed with the electrodes 60a and 61a. A voltage Vin having a rectangular waveform is applied from a source 20 to the circuit in which a resister R1 is connected in series to the capacitor Cap. FIG. 12B shows the waveform of the voltage Vin. A volt meter 21 is used to measure the difference between the voltages at the two ends of the capacitor Cap.

Figure 12C:
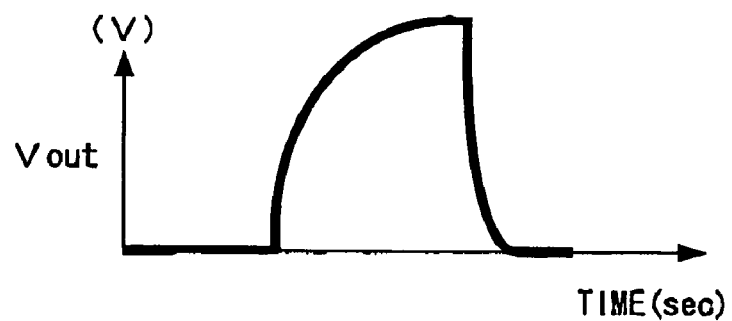

Since the circuit shown in FIG. 12A constitutes an RC circuit, the voltage value Vout measured with the volt meter 21 can be expressed as in (3) below. Namely, the voltage waveform such as that shown in FIG. 12C is measured with the volt meter 21. Since the resistance value Ra is known in advance, the electrostatic capacity Ca can be determined in correspondence to Ca·Ra calculated based upon expression (3).

$$V_{out}=V_{in}\{1-\exp(t/Ca\cdot Ra)\} \quad (3)$$

Figure 13:
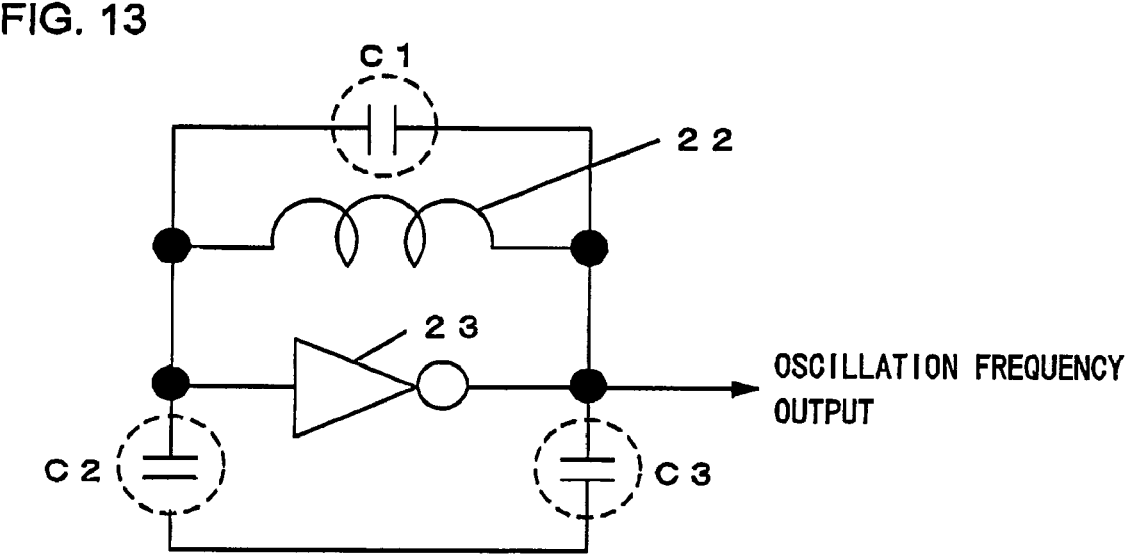
FIG. 13 shows an oscillation circuit.

Next, a method for determining the electrostatic capacity Ca based upon an oscillation frequency is explained. FIG. 13 shows an oscillation circuit achieved by connecting in parallel a coil 22 and a phase inversion amplifier 23. The circuit in this example is structured so that the electrostatic capacity of the electrostatic actuator constitutes a parameter of the oscillation circuit. For instance, a capacitor constituted with the electrodes 60a and 61a is connected at one of positions indicated with reference numeral C1, C2 or C3. If the capacitor is connected at the position C2, the capacitor Cap is connected between the input of the phase inversion amplifier 23 and the ground, whereas the capacitor is connected between the output of the phase inversion amplifier 23 and the ground if the capacitor is connected at the position C3.

The frequency of an AC signal output from the oscillation circuit, i.e., the oscillation frequency Fosc, can be calculated as expressed in (4) below. Accordingly, by detecting the oscillation frequency Fosc, the electrostatic capacity Ca can be calculated based upon expression (4) below. When opening/closing the arms by varying the voltage V, the electrostatic capacity Ca is calculated by detecting the frequency Fosc sequentially over predetermined time intervals, and the curve L3 in FIG. 11 can be obtained. After the sample Sa is gripped at the position corresponding to a point P, the electrostatic capacity Ca which is calculated subsequently changes as indicated by the curve L4 or the curve L5. Namely, by calculating the electrostatic capacity Ca based upon the frequency Fosc, the point of inflection P can be detected.

$$F_{osc}(Hz)=1/2\cdot\pi(L\cdot Ca)^{1/2} \quad (4)$$

(Detection Executed by Using Oscillation Circuits)

Figure 23:
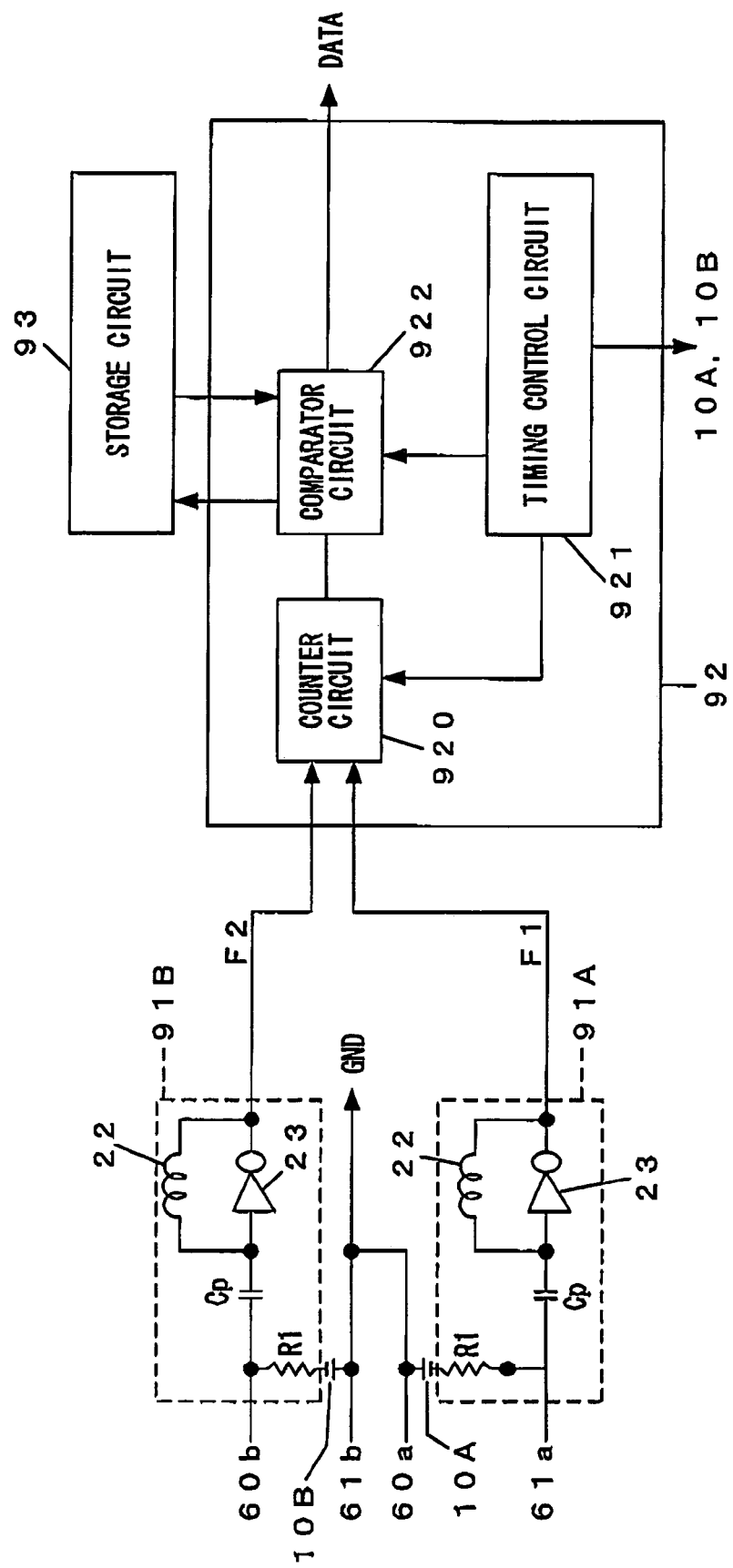
FIG. 23 shows the circuit unit having the detection circuit constituted with an oscillation circuit.

FIG. 23 shows the circuit unit 9 having the detection circuits 91A and 91B each constituted with the oscillation circuit shown in FIG. 13. Since the AC impedance at the DC sources 10 takes on a value close to 0Ω, the fixed electrodes 60a and 60b and the movable electrodes 61a and 61b constituting the actuators are shorted, disabling the operation of the oscillation circuits. Accordingly, resistors R1 are disposed each in series to the DC source 10A or 10B. Since the impedance at the actuators is determined in correspondence to the value assumed at the resistors R1, the oscillation circuits can be engaged in operation by selecting a value equal to or greater than 1 (MΩ) for R1.

If an external force is applied to the arms 3 and the fixed electrodes 60a and 60b come in contact with the movable electrodes 61a and 61b in a structure that does not include the resistors R1, the DC sources 10A and 10B will be shorted to result in the electrodes becoming fused or welded. However, by controlling the electrical current with the resistors R1, fusing of the electrodes and the like can be prevented.

Between each oscillation circuit and the corresponding DC sources 10A or 10B, a capacitor Cp for DC cutoff is disposed. With the capacitors Cp, a flow of DC current from the DC sources 10A and 10B into the oscillation circuits or a flow of DC current from the oscillation circuits into the DC sources 10A and 10B can be prevented. Thus, it is desirable to set the electrostatic capacities of the capacitors Cp to a value considerably larger than the electrostatic capacity of the drive unit 6.

As explained earlier, the electrostatic capacities between the fixed electrode 60a and the movable electrode 61a and between the fixed electrode 60b and the movable electrode 61b each constitute part of the circuit constant of the corresponding oscillation circuit. For this reason, frequencies F1 and F2 of AC signals (oscillation frequency outputs) output from the individual detection circuits 91A and 91B change as the electrostatic capacities between the fixed electrode 60a and the movable electrode 61a and between the fixed electrode 60b and the movable electrode 61b change. These AC signals are both input to a counter circuit 920 at the arithmetic operation circuit 92.

Figure 24A:
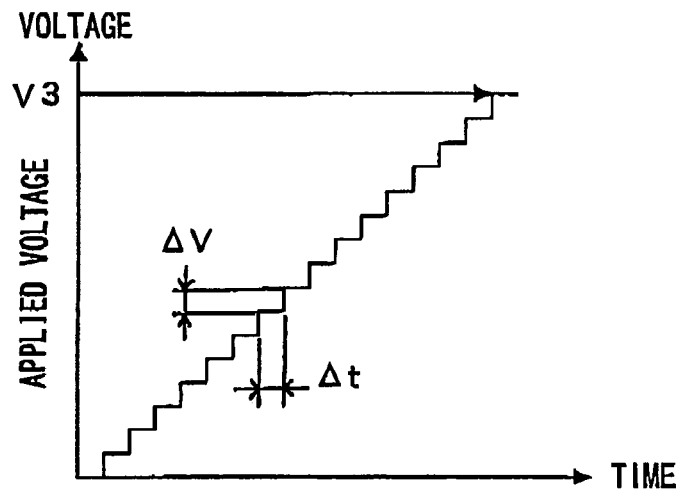
FIG. 24A shows the change occurring in the applied voltage.

When closing the arms 3 by applying a voltage to the fixed electrodes 60a and 60b and the movable electrodes 61a and 61b at the drive unit 6, the voltage is increased in steps as shown in FIG. 24A. A timing control circuit 921 outputs a trigger signal to the DC sources 10A and 10B overtime intervals Δt, and in response, the DC sources 10A and 10B each step up the voltage by ΔV each time the trigger signal is received. V3 indicates the voltage at which the sample becomes gripped.

As shown in FIG. 24A, the gaps between the fixed electrode 60a and the movable electrode 61a and between the fixed electrode 60b and the movable electrode 61b become smaller in steps and the corresponding electrostatic capacities, too, increase in steps as the applied voltage increase in steps. As a result, the frequencies F1 and F2 of the signals output from the detection circuits 91A and 91B change in steps over the time intervals Δt, as shown in FIG.

Figure 24B:
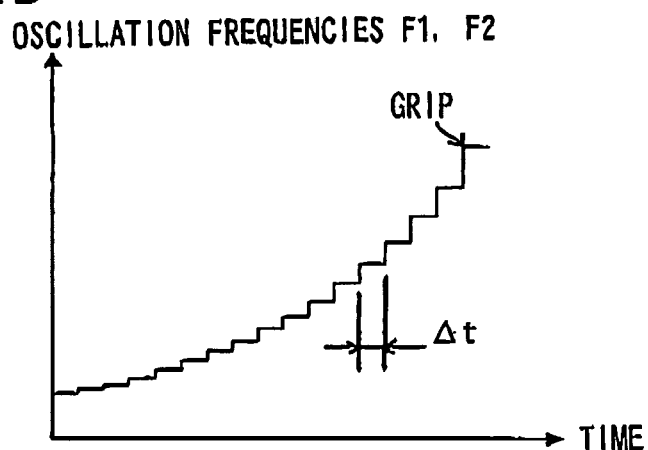
FIG. 24B shows the change in the oscillation frequency and FIG. 24C shows the change in the count value, all observed during the arm closing operation.

24B. The timing control circuit 921 outputs a trigger signal to the counter circuit 920 so as to synchronize the timing with which the counter circuit 920 is engaged in a counting operation with the time interval Δt shown in FIG. 24B.

Figure 24C:
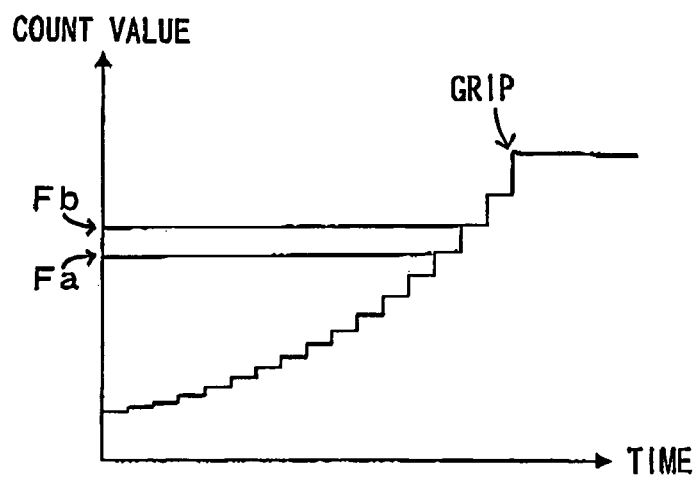

A count value Fa (see FIG. 24C) having been counted at the counter circuit 920 is first stored into the storage circuit 93, and a comparison decision-making circuit 922 compares the count value Fa with a count value Fb obtained through the counting operation executed in response to the next trigger. The comparison decision-making circuit 922 determines the difference (Fb−Fa) between the count value Fb and the count value Fa and makes a decision as to whether or not the difference (Fb−Fa) is smaller than a predetermined threshold value. If it is determined that the difference (Fb−Fa) is smaller than the threshold value, data indicating that the sample has been gripped are output. Since the electrostatic capacities become constant once the movement of the arms 3 stops, the difference (Fb−Fa) should assume the value 0 in principle. Accordingly, even with factors such as drift taken into consideration, it is preferable that the threshold value assumes a value close to 0.

In the related art, the state of the hold on an ultrasmall sample by a nanogripper has to be visually verified. However, the nanogripper device in the embodiment makes it possible to verify with ease and accuracy whether or not the sample Sa has been gripped by detecting the electrostatic capacity Ca at the drive unit 6 constituting the electrostatic actuators In addition, by setting the applied voltage to a predetermined value, as explained later, after verifying that the sample has been gripped, it is possible to ensure that no excessive gripping force is applied to the sample.

(Gripping Force Ga)

Next, a method that may be adopted to calculate the gripping force is explained. In this example, the gripping force Ga imparted by the arms 3 is determined based upon expression (2). The distance Da between the arms 3 can be expressed as Da=D0−2x with x representing the distance over which each arm 3 move and D0 representing the distance between the arms 3 when no voltage is applied. Accordingly, expression (2) can be modified to expression (5) below.

$$F = \varepsilon_0 bNV^2 \left( \frac{1}{2g} + \frac{w}{2\left(l_0 + \frac{D-D0}{2}\right)^2} \right) \quad (5)$$

The coulomb force Fa is expressed as a function Fa(V, D) of the applied voltage Va and the distance Da. The relationship between the applied voltage Va and the distance Da, which is determined by the coulomb force Fa and the level of elastic forces at the support units 62 and 63, can be qualitatively indicated as in FIG. 7. With D3 representing the distance between the arms when the applied voltage is at V3, the corresponding coulomb force Fa(V3, D3) is in balance with the level of the elastic force imparted at the support units 62 and 63. Namely, the level of the elastic force imparted when the distance between the arms is D3 is equal to Fa(V3, D3) and likewise the levels of the elastic force imparted when the distance is D1 and D2 are respectively equal to Fa(V1, D1) and Fa(V2, D2). The gripping force Ga is expressed as in (6) below, and Ga=0 if the applied voltage is V3 in the state shown in FIG. 8D.

(gripping force Ga)=(coulomb force Fa)−(elastic force)    (6)

(When Sample Sa is Not Deformable)

Figure 11:
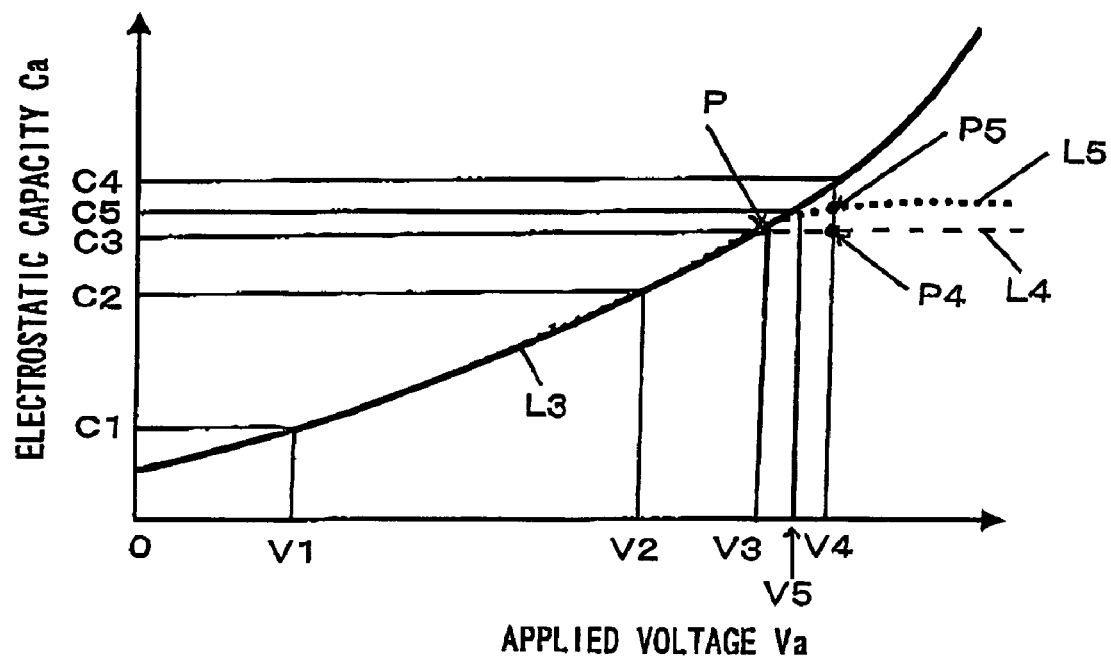
FIG. 11 shows points of inflection.

In the case of a non-deformable sample Sa, the distance is sustained at D3 even when the applied voltage is increased up to V4 in FIG. 7 and thus, the electrostatic capacity, too, remains unchanged from C3 (see FIG. 11). The coulomb force induced in this situation is Fa(V4, D3) and the corresponding elastic force is Fa(V3, D3). As expression (5) indicates, Fa(V4, D3)>Fa(V3, D3), and with Ga(V4, D3) representing the corresponding gripping force, expression (6) is written as Ga(V4, D3)=Fa(V4, D3)−Fa(V3, D3).

Thus, the gripping force Ga (V, D3) when Va>V3 is true for the applied voltage Va can be expressed as in (7) below by using the elastic force Fa(V3, D3) imparted at the point of inflection P (distance D3). It is to be noted that the distance D3 between the arms corresponding to Fa(V3, D3) can be determined based upon a correlation of the electrostatic capacity C3 achieved when the point of inflection P in FIG. 11 is detected and the correlation shown in FIG. 9, and V3 in Fa(V3, D3) can be determined based upon a correlation of the electrostatic capacity C3 and the curve in FIG. 10. These correlations are all stored in a storage unit 625 in advance.

$$Ga(V, D3) = Fa(V, D3) - Fa(V3, D3) \quad (7)$$

(When Sample Sa is Deformable)

As indicated by the curve L5 in FIG. 11, the point P5 corresponds to the voltage V4 applied when the sample Sa gripped by the arms 3 becomes deformed. The distance D5 between the arms corresponding to the point P5 can be determined based upon the electrostatic capacity C5 detected under such circumstances and the correlation shown in FIG. 9. Since C3<C5<C4 in FIG. 11 is true, D3<D5<D4 is also true. The level of the elastic force imparted at the support units 62 and 63 when the distance is D5 is Fa(V5, D5), and the level of the coulomb force corresponding to the distance D5 between the arms and the applied voltage V4 is Fa(V4, D5). Since V5<V4, Fa(V5, D5)<Fa(V4, D5) can be deduced from expression (5). The corresponding gripping force can be expressed as the difference between the coulomb force and the elastic force, i.e., Fa(V4, D5)−Fa(V5, D5).

Accordingly, the gripping force Ga(V, D5) on the deformable sample Sa is expressed as in (8) below by using the elastic force Fa(V5, D5) at a point P5 (distance D5). It is to be noted that V5 can be determined based upon the electrostatic capacity C5 and the correlation shown in FIG. 10.

$$Ga(V, D5) = Fa(V, D5) - Fa(V5, D5) \quad (8)$$

The gripping force is actually determined through the following procedure, regardless of whether or not the sample Sa is deformable. First, the electrostatic capacity is detected and based upon the detected electrostatic capacity and the relationships shown in FIGS. 9 and 10, the distance Da between the arms and the voltage Va are determined, and then the elastic force is calculated based upon Da and Va having been determined in expression (5). In addition, the level of the coulomb force which is actually at work is calculated in correspondence to the distance between the arms determined based upon the actual applied voltage Va and the actual electrostatic capacity. Lastly, the gripping force is determined by calculating the difference between the coulomb force and the elastic force.

The gripping force imparted when the sample is not deformable is calculated as in (7), since the electrostatic capacity is C3, the elastic force is Fa (V3, D3) and the coulomb force actually at work is Fa(V, D3). The gripping force imparted when the sample is deformable is calculated as in (8) since the electrostatic capacity is C5, the elastic force is Fa(V5, D5) and the coulomb force actually at work is Fa(V, D5).

As described above, since the level of the gripping force can be ascertained, the nanogripper in the embodiment is enabled to operate with the gripping force with a level corresponding to the type of the sample Sa. This feature is particularly advantageous when the sample is a biological sample, since damage to the biological sample due to an excessive gripping force can be prevented.

Figure 25:
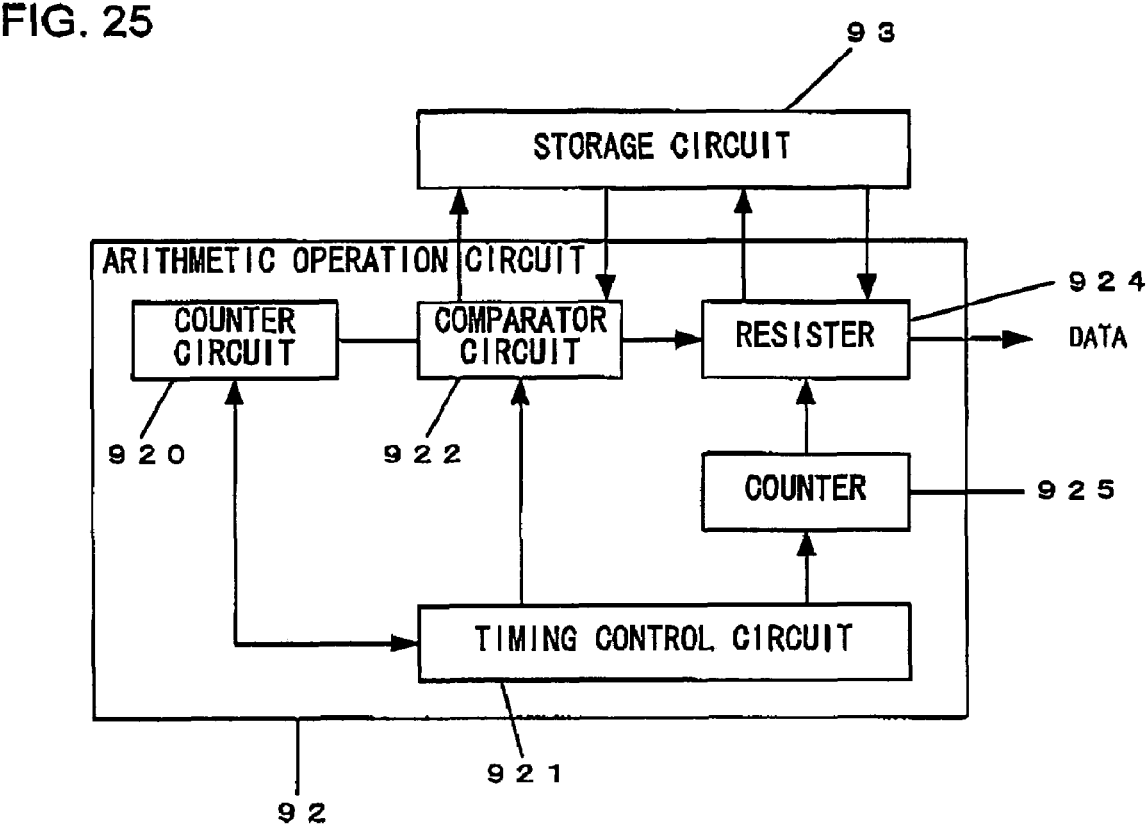
FIG. 25 shows the structure of the arithmetic operation circuit engaged in operation during gripping force detection.
Figure 26A:
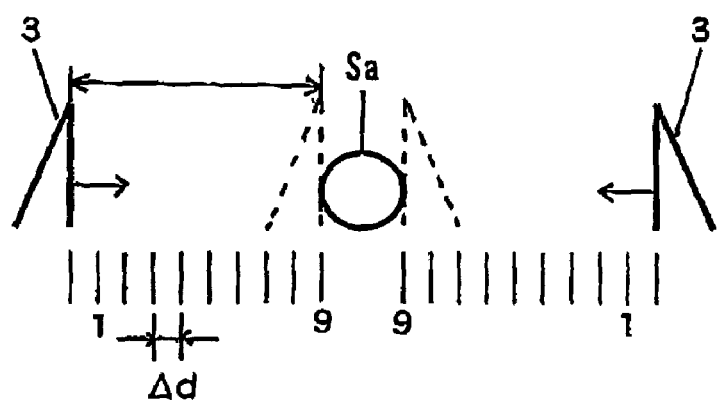
FIG. 26A shows the arms engaged in operation to grip the sample and FIG. 26B shows the relationship between the voltage applied to the electrodes and the extent to which the arms are caused to move.

The gripping force is calculated in a circuit achieved by modifying the circuit shown in FIG. 23 to that shown in FIG. 25. A counter 925 counts the number of triggers output to the DC sources 10A and 10B. The count value is stored into a resistor 924. For instance, the arms 3 may grip the sample Sa when, following the initial state in which the applied voltage is at 0, nine trigger outputs have been counted, as shown in FIG. 26A. Each time the trigger is output, the applied voltage is increased by $\Delta V$.

Figure 26B:
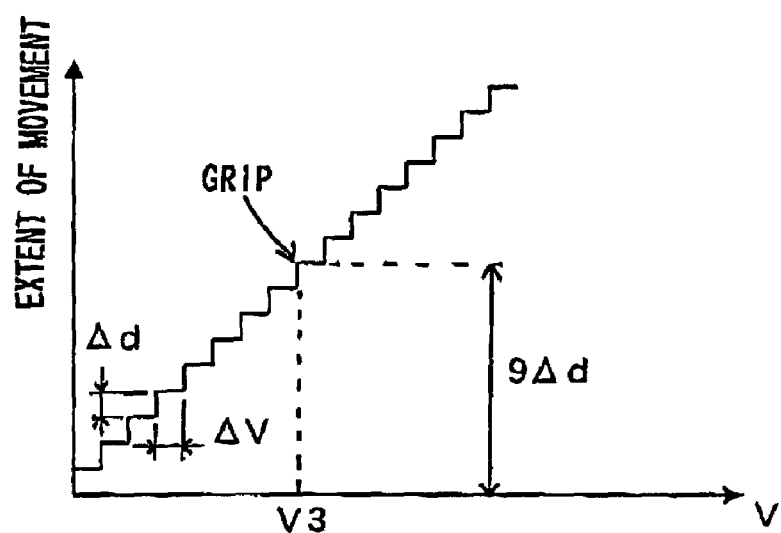

In the range over which a linear relationship exists between the voltage and the displacement of the drive unit 6, the extent to which the arms 3 need to move before gripping the sample is calculated as $9\Delta d$ (see FIG. 26B) with $\Delta d$ representing the range of movement corresponding to each $\Delta V$. When such a linear relationship does not exist, the range of movement is calculated as the sum of the distances, i.e., $\Delta d1+\Delta d2+ \ldots \Delta d$. If the applied voltage keeps increasing in response to trigger signals output after the sample is gripped, the increase in the voltage occurring after the sample is gripped is calculated as (Ct–9) $\Delta V$ with Ct representing the count value indicating the number of trigger signals having been counted since the start of the applied voltage increase. The gripping force can be calculated as explained earlier based upon the voltage increase (Ct–9) $\Delta V$. Alternatively, a specific level of gripping force may be set in advance from the outside and once the gripping force reaches the preset level, the trigger output may be stopped so as to ensure that the applied voltage does not keep increasing after the sample is gripped.

(Measurement of Sample Dimensions)

The correlation between the applied voltage Va and the distance Da between the arms 3 shown in FIG. 7 can be ascertained in advance. In the embodiment, the correlation determined in advance is stored in memory in the storage circuit 93 as a table. As the point of inflection P is determined while the arms are closing toward the sample Sa, the distance D3 between the arms at the point of inflection P is calculated based upon the applied voltage V3 at the point of inflection P and the correlation shown in FIG. 7. The distance D3 matches the diameter of the sample Sa. For instance, if the arms 3 are driven in steps as described earlier, the correlation between the count value at the counter 925 and the distance Da, such as that shown in FIG. 27, should be stored in memory at the storage circuit 93. Based upon the count value obtained through the actual counting operation and the correlation shown in FIG. 27, the distance Da is determined. The distance Da thus calculated is output as data to the outside from the arithmetic operation circuit 92.

If the sample Sa is a thinly sliced sample, the thickness of the thinly sliced sample Sa can be measured by clamping the sample with the arms 3 at the front and rear surfaces. The nanogripper in the embodiment is capable of measuring the dimensions of an ultrasmall sample as well as gripping and carrying the sample. In addition, it is capable of measuring dimensions such as a groove width by using the outer side surfaces of the grip portions 3a shown in FXG. 2. Since the distance between the outer side surfaces of the left and right grip portions 3a is 2W when the arms 3 are closed, the measurement of a groove width is enabled as long as the groove width is 2W or greater.

The grip portions 3a are inserted at the groove while the arms 3 are in a closed state and then the arms 3 axe opened as the applied voltage Va is gradually reduced. In other words, control is implemented so that the level of the applied voltage Va changes toward the left side on the curve L3 in FIG. 11. Then, as the outer side surfaces of the grip portions 3a contact the side surfaces of the groove at a point Q, the distance between the arms 3 stops changing even if the applied voltage Va is further reduced. Namely, the relationship such as that indicated by the curve L6 is achieved between the applied voltage Va and the electrostatic capacity Ca, and the electrostatic capacity Ca becomes constant. Then, based upon the applied voltage V6 at the point Q and the correlation shown in FIG. 7, the distance Da between the arms 3 can be calculated. The groove width in this situation is measured to be Da–2W.

(Production Process Through Which Nanogripper Device 2 is Manufactured)

Next, an explanation is given on a manufacturing method that may be adopted when forming the nanogripper device 2 by using an SOI (silicon on insulator) substrate. It is to be noted that the following explanation focuses on the method for forming the arms 3 and the drive unit 6, and an explanation or an illustration of the method for forming the circuit 9 is not provided. The circuit unit 9 may be formed through the semiconductor processing technology in the same silicon layer as that used to form the arms 3 and the drive unit 6, or circuit elements having been separately formed may be disposed onto the base body 7. A substrate 100 used to manufacture the nanogripper device 2 is a silicon substrate achieved by sequentially laminating a base layer 101 constituted of single crystal silicon with a (110) orientation, an insulating layer 102 constituted of silicon oxide and a silicon layer 103 constituted of single crystal silicon with the (110) orientation.

Instead of an SOI substrate, a substrate having a single crystal silicon layer deposited on a glass substrate, an amorphous silicon substrate, a substrate having an SOI layer formed on a polysilicon substrate or the like may be used as the silicon substrate 100. Namely, the base layer 101 at the silicon substrate may adopt a multilayer structure, as long as the uppermost layer is the silicon layer 103 with the (110) orientation and the insulating layer 102 is formed under the silicon layer 103.

Figure 14A:
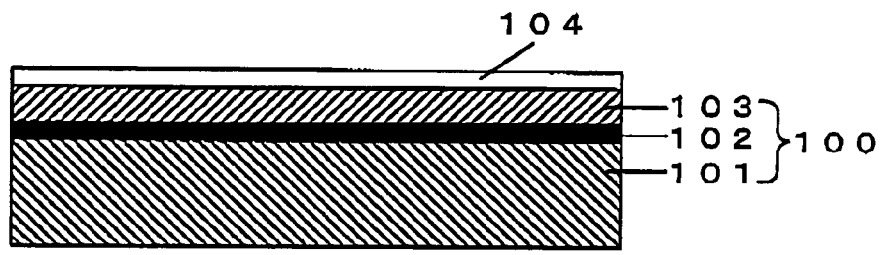
FIGS. 14A to 14D illustrate the procedure for manufacturing a nanogripper device.

The individual layers at the silicon substrate 100 may be formed so that the silicon layer 103, the insulating layer 102 and the base layer 101 respectively achieve a 25 µm thickness, a 1 µm thickness and a 300 µm thickness, for instance. In addition, an area over which a gripper is to be formed on the silicon substrate 100 assumes a rectangular shape ranging over several millimeters both longitudinally and laterally. In the step shown in FIG. 14A, an aluminum layer 104 is formed so as to achieve a thickness of approximately 50 nm at the surface of the silicon layer 103 through sputtering or vacuum deposition.

Figure 14B:
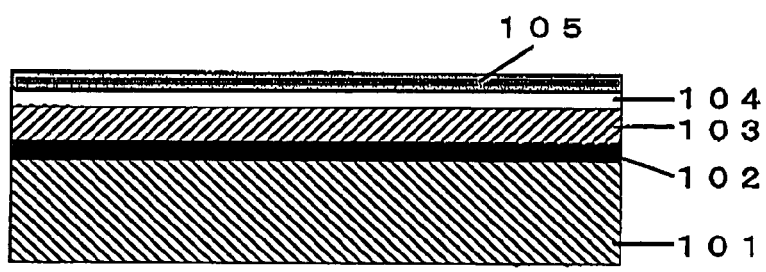
Figure 14C:
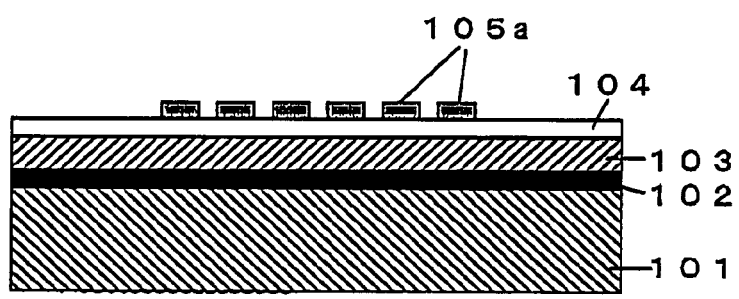
Figure 17:
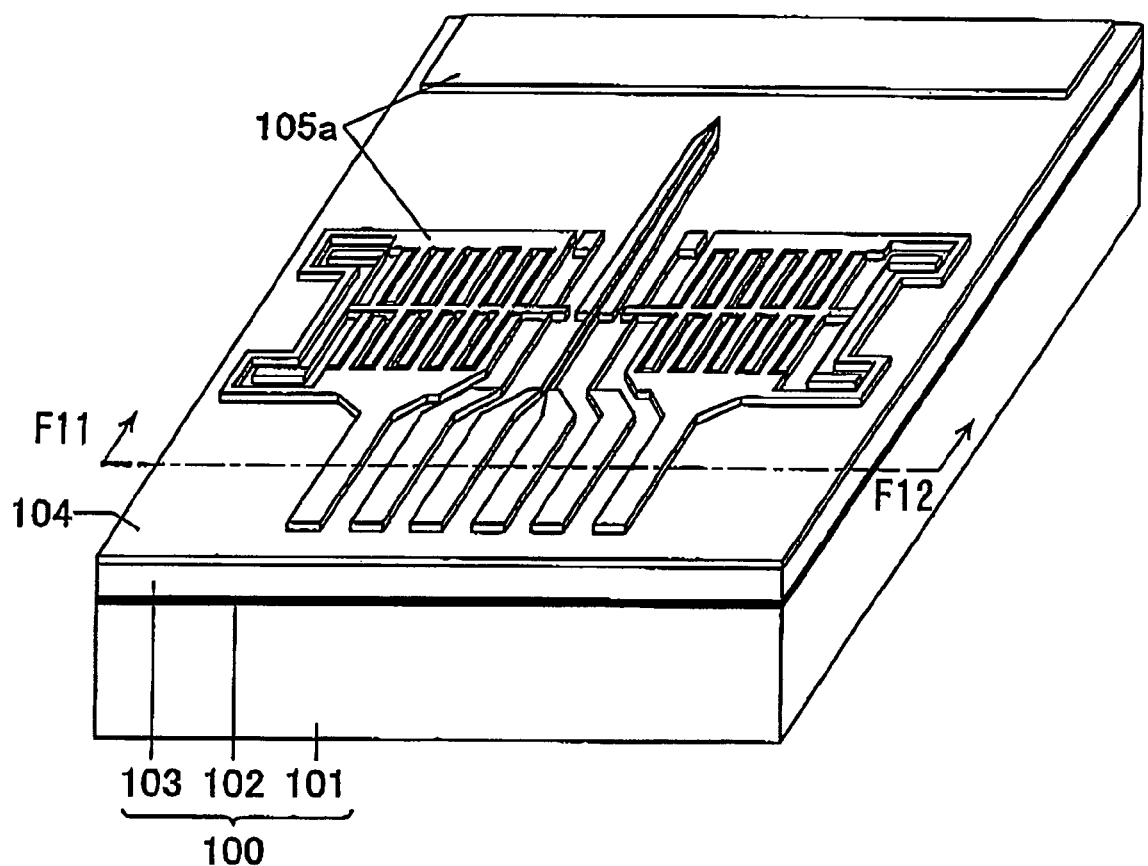
FIG. 17 is a perspective of the silicon substrate in FIG. 14C.

Next, as shown in FIG. 14B, a resist 105 with an approximately 2 µm thickness is formed on the surface of the aluminum layer 104, and then, a resist pattern 105a shown in FIG. 14c is formed by exposing and developing the resist 105 through photolithographic method. FIG. 17 is a perspective of the silicon substrate 100, at which the resist pattern 105a corresponding to the arms, the guard 4, the drive unit 6 and the like is formed over the upper surface of the aluminum layer 104. It is to be noted that FIG. 14C is a sectional view taken along F11-F12 in FIG. 17.

Figure 14D:
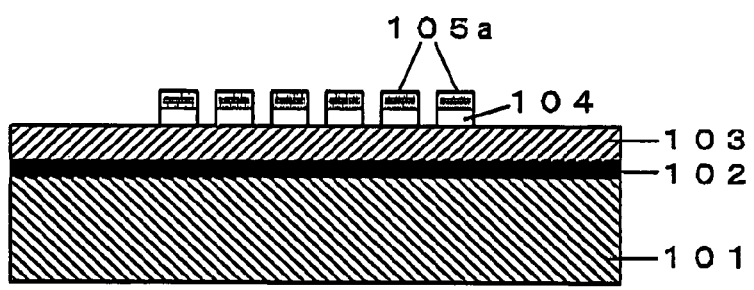
Figure 15A:
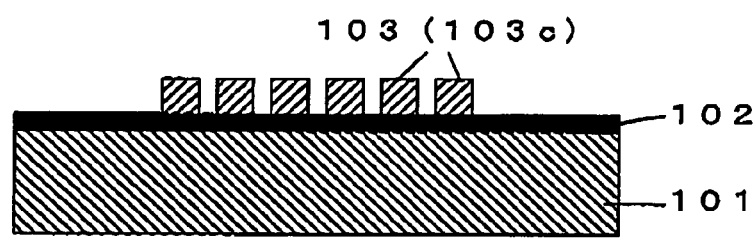
FIGS. 15A to 15C illustrate manufacturing steps in continuation from FIGS. 14A to 14D.

Next, as shown in FIG. 14D, the aluminum layer 104 is etched with a mixed acid solution by using the resist pattern 105a as a mask until the silicon layer 103 is exposed. Subsequently, through ICP-RIE (inductively coupled plasma-reactive ion etching), the silicon layer 103 is anisotropically etched along the vertical direction. This etching process is executed until the insulating layer 102 becomes exposed, and after the etching process, the resist pattern 105a and the aluminum layer 104 are removed by using a mixed solution containing sulfuric acid and hydrogen peroxide (see FIG. 15A).

Figure 18:
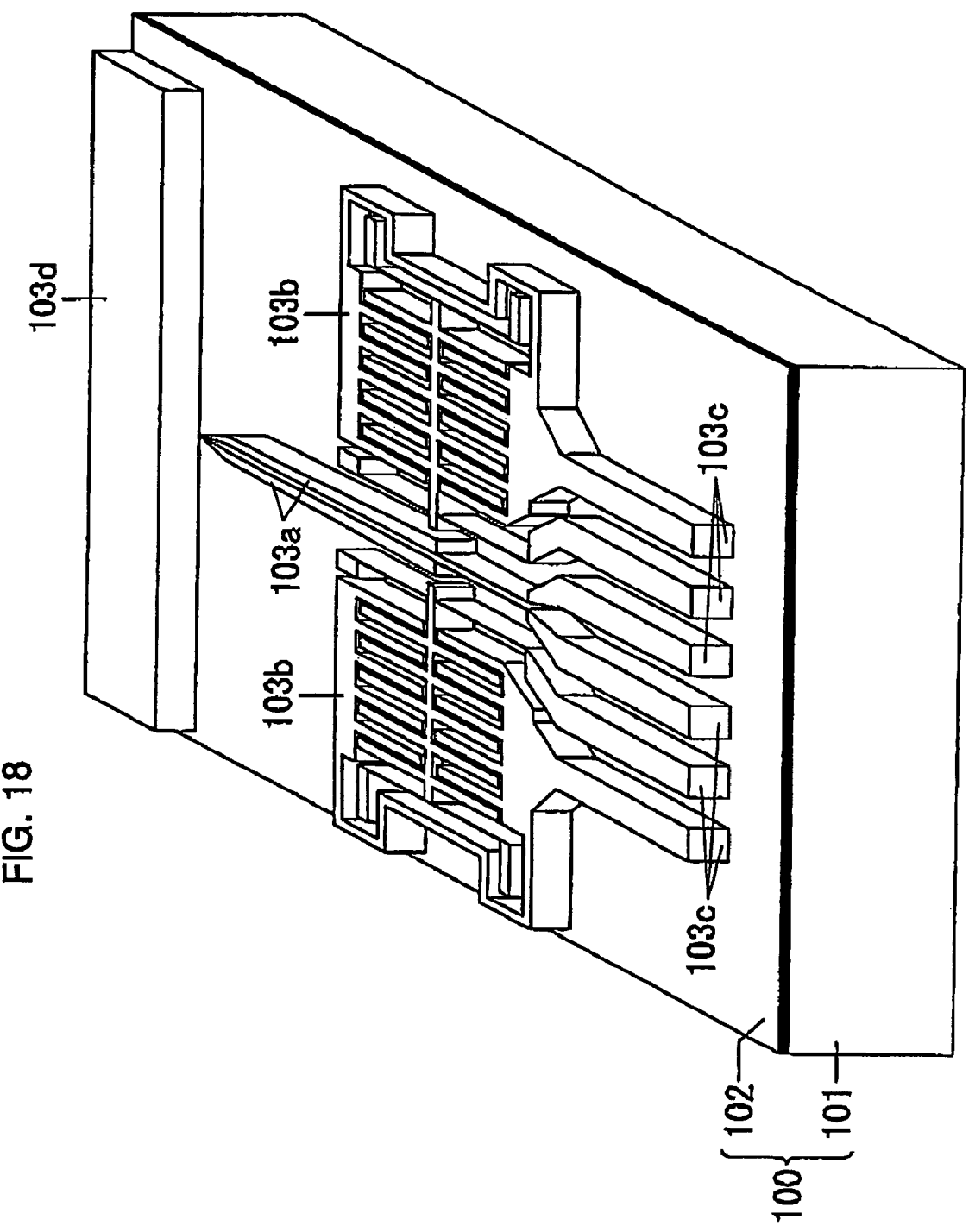
FIG. 18 is a perspective of the substrate with the resist pattern with the aluminum layer having been removed.

FIG. 18 is a perspective of the substrate 100 following the removal of the resist pattern 105a and the aluminum layer 104. Over the insulating layer 102, a three-dimensional structure is formed with the single silicon layer 103. The three-dimensional structure includes portions 103a to constitute the arms 3, a portion 103b to constitute the drive units 6, portions 103c to constitute the electrode terminals 80 to 84 and a portion 103d to constitute the guard 4.

Figure 15B:
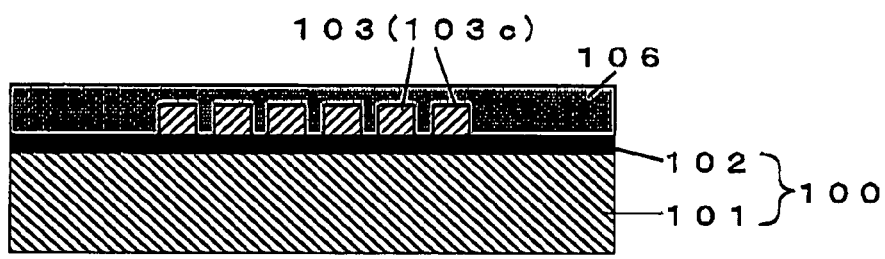
Figure 19:
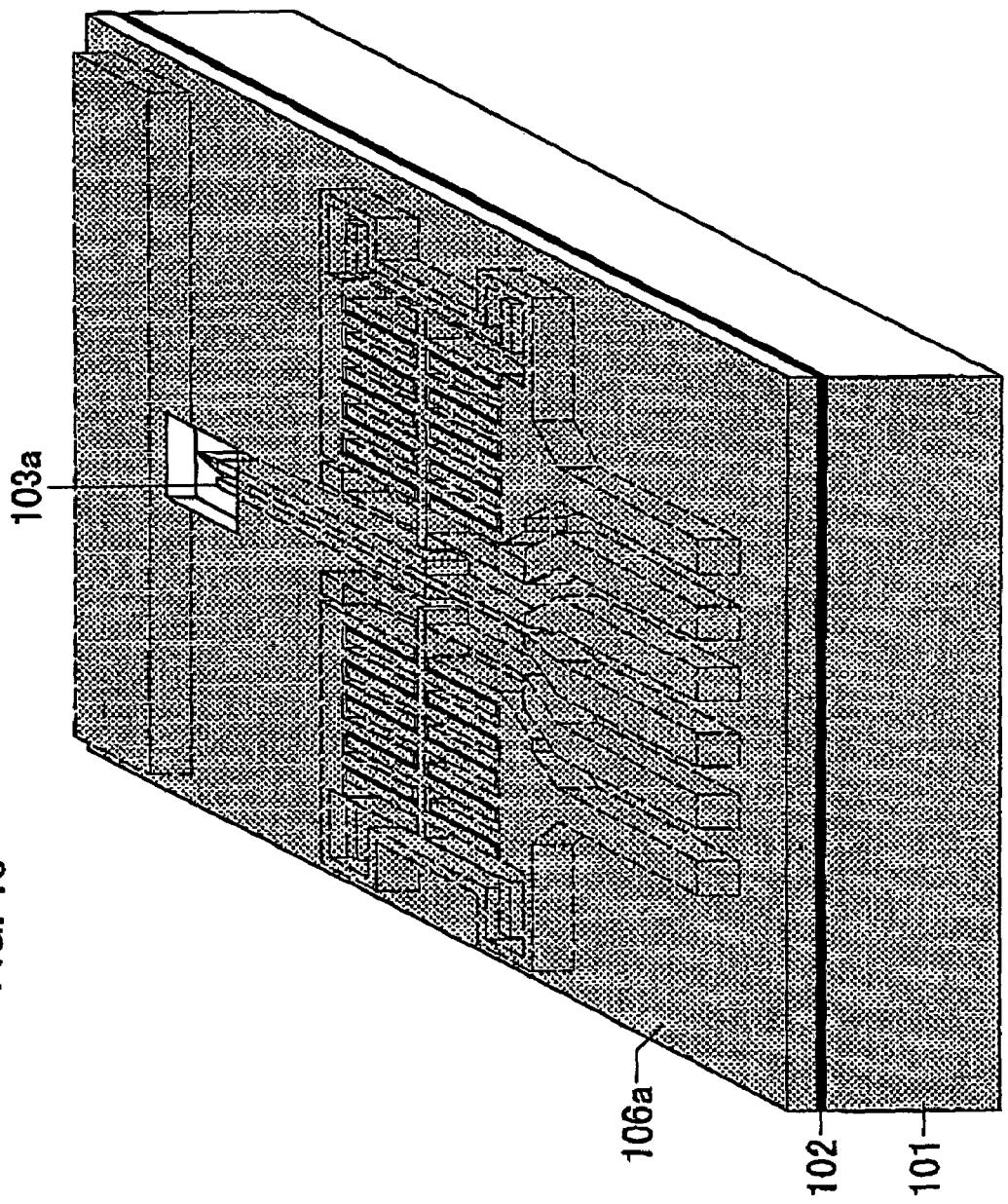
FIG. 19 is a perspective of the resist pattern.

Next, a resist 106 is applied so as to cover the insulating layer 102 and the silicon layer 103 (103a to 103d) having become exposed (see FIG. 15B). The resist coating 106 should be applied over a thickness of approximately 10 μm. Subsequently, a mask pattern is transferred onto the resist 106 and is developed through photolithography and, as a result, a resist pattern 106a with the resist 106 removed over a rectangular area at the front end side of the arm constituting portions 103a is formed as shown in FIG. 19. Then, the front end portions of the arm constituting portions 103a are processed to achieve a shape and size matching those of the target sample to be gripped with the gripper through an ICP-RIE process or the regular RIE process executed by using the resist pattern 106a as a mask.

Figure 15C:
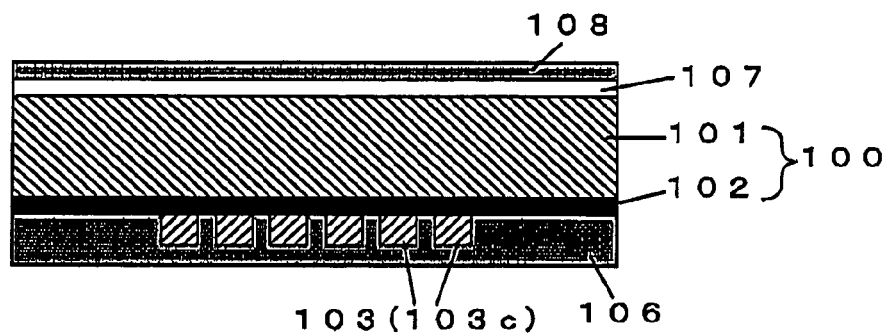

Next, as shown in FIG. 15C, the front and rear sides of the substrate 100 are reversed and an aluminum layer 107 is formed over the surface of the base layer 101 through sputtering or vacuum deposition. The aluminum layer 107 is formed so as to achieve a thickness of approximately 50 nm. After forming a resist 108 with a thickness of approximately 2 μm over the aluminum layer 107, a resist pattern is formed through photolithography, and the aluminum layer 107 is etched with a mixed acid solution by using the resist 108 as a mask (see FIG. 16A).

Figure 16A:
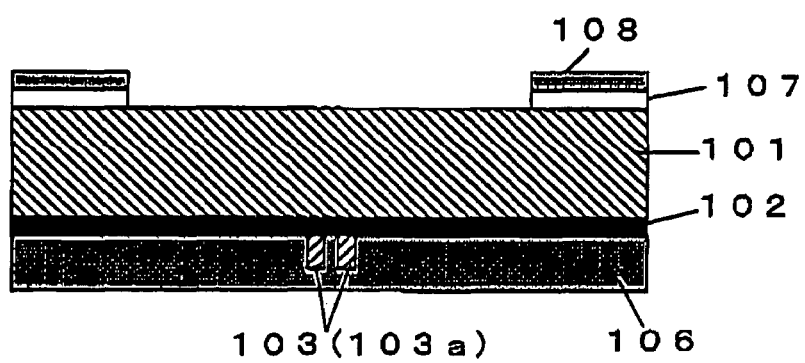
FIGS. 16A to 16D show manufacturing steps in continuation from FIGS. 15A to 15D.
Figure 20:
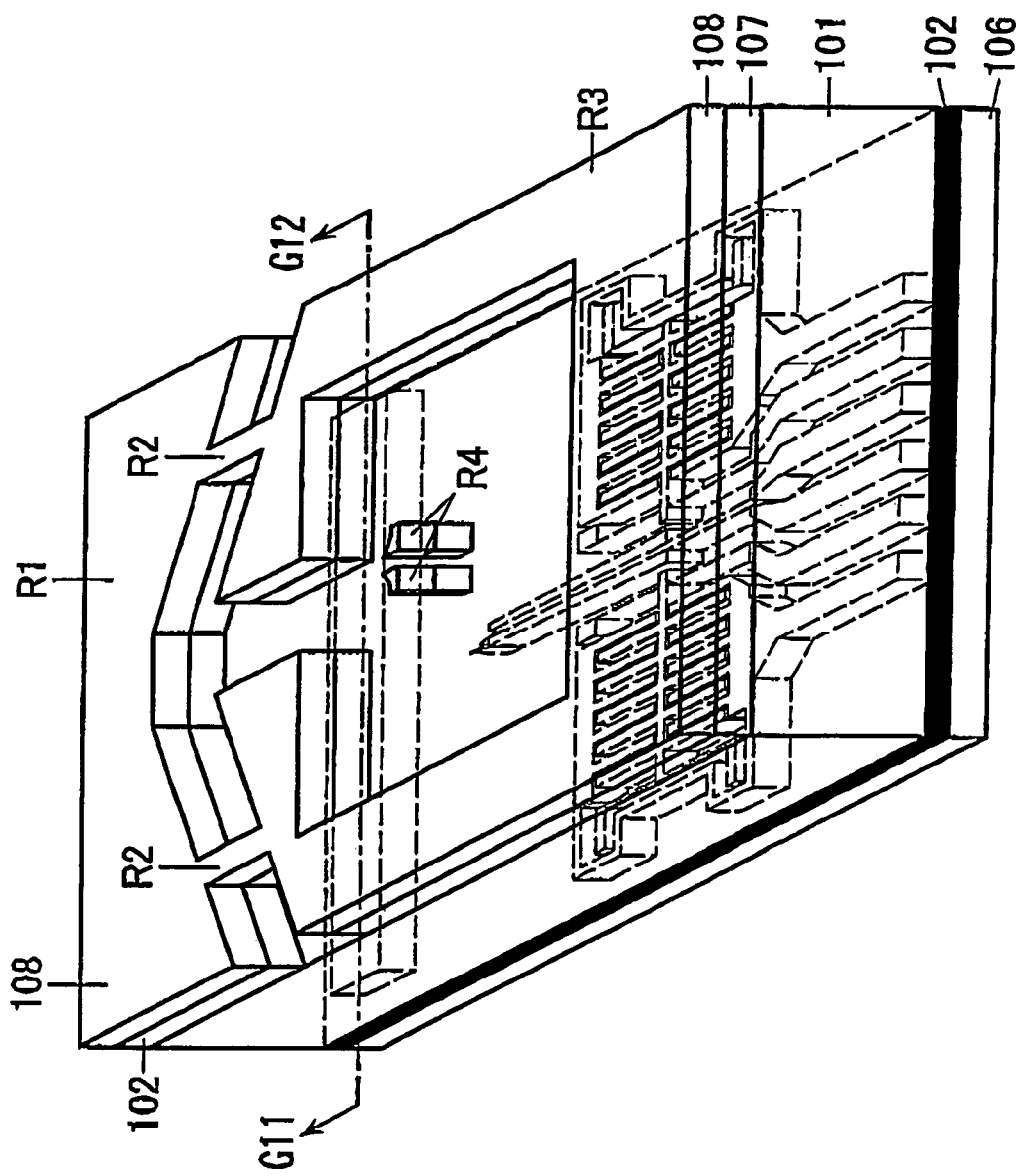
FIG. 20 is a perspective showing the shapes of the resist and the aluminum layer in FIG. 16A.

FIG. 20 is a perspective showing the shapes of the resist 108 and the aluminum layer 107. FIG. 16A is a sectional view taken along G11-G12 in FIG. 20, with sections of the arm portions 103a constituted with the silicon layer 103 shown on the lower side (toward the front surface) of the insulating layer 102. As FIG. 20 indicates, the resist 108 remains not removed at a portion R1 corresponding to the guard 4 in FIG. 1, at portions R2 corresponding to the link portions 5, at a portion R3 corresponding to the base body 7 and at portions R4 corresponding to the linking members 8 in FIG. 5, whereas the portions corresponding to the through-holes 7a and 7b in FIG. 5 have been removed, exposing the base layer 101.

Subsequently, by using the resist 108 and the aluminum layer 107 formed over the base layer 101 as a mask, the base layer 101 is etched through ICP-RIE. The base layer 101 is anisotropically etched along the vertical direction. The base layer is etched until the insulating layer 102 becomes exposed. Upon completing the etching process, the resists 108 and 106 and the aluminum layer 107 are removed (see FIG. 16B) with a mixed solution containing sulfuric acid and hydrogen peroxide.

Figure 16B:
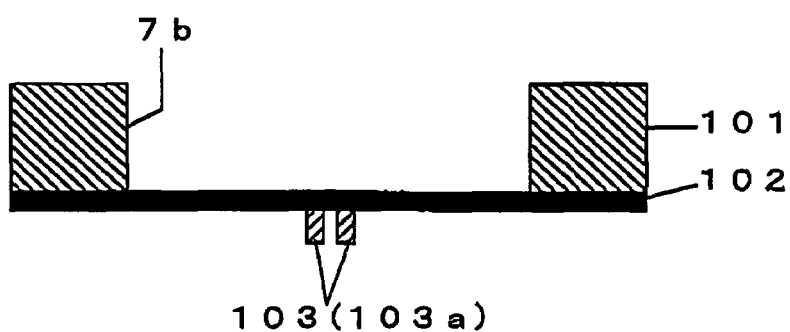
Figure 21:
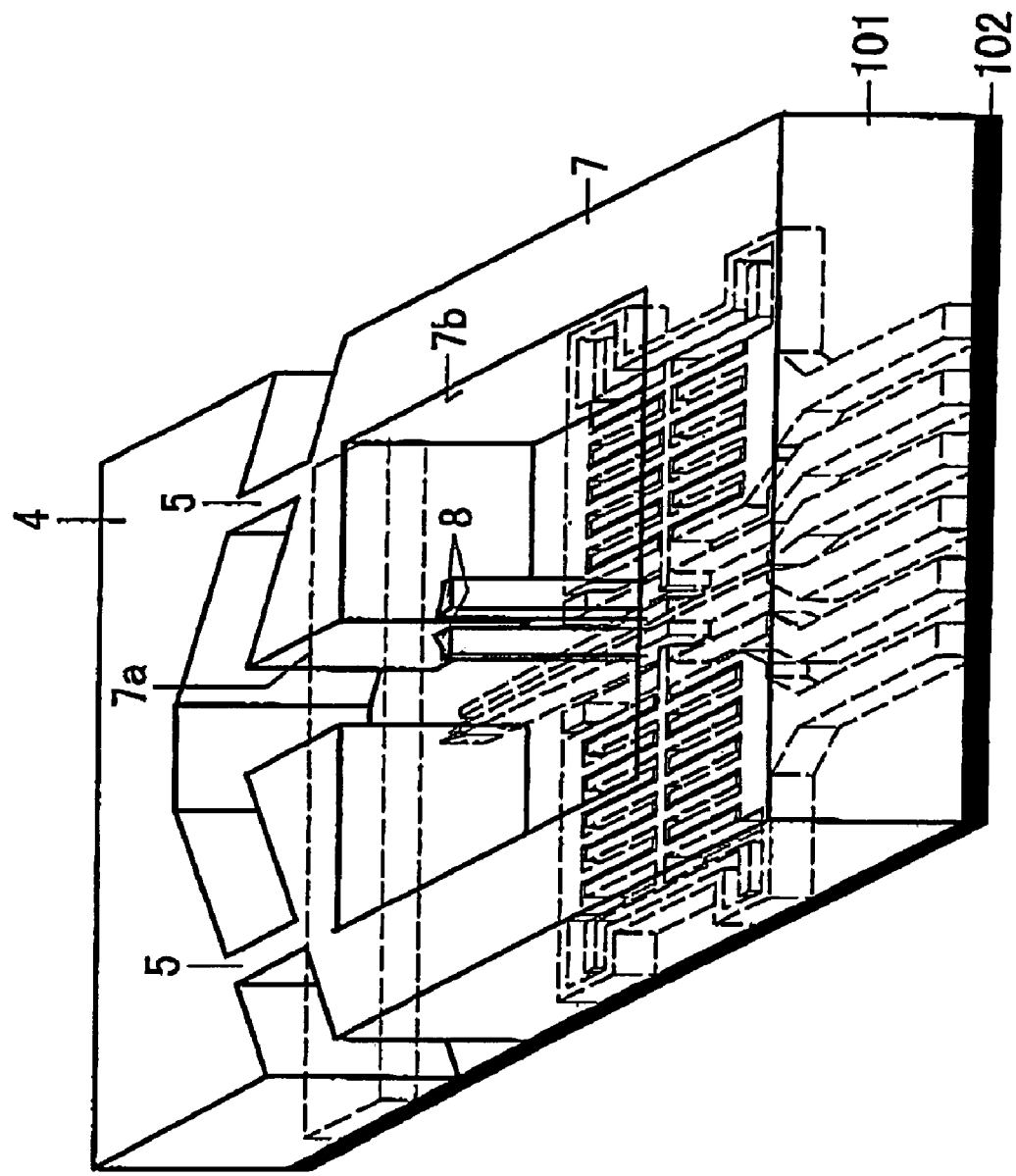
FIG. 21 shows the rear surface side of the base layer in FIG. 16B.

FIG. 21 shows the rear surface side of the base layer 101 in FIG. 16B. At the base layer 101, the base body 7 having the through-holes 7a and 7b, the guard 4, the link portions 5 and the linking members 8 have been formed through etching. As a plurality of nanogripper devices 2 each having a guard 4 are formed on the substrate 100 under normal circumstances, they are divided into individual nanogripper devices 2 through this etching process. Next, the insulating layer 102 constituted of silicon oxide, having been exposed over the base body, is etched by using a buffer hydrogen fluoride solution. As a result, the insulating layer 102 is removed except for the insulating layer present over areas where it is sandwiched between the silicon layer 103 and the base layer 101 (see FIG. 16C).

Figure 16C:
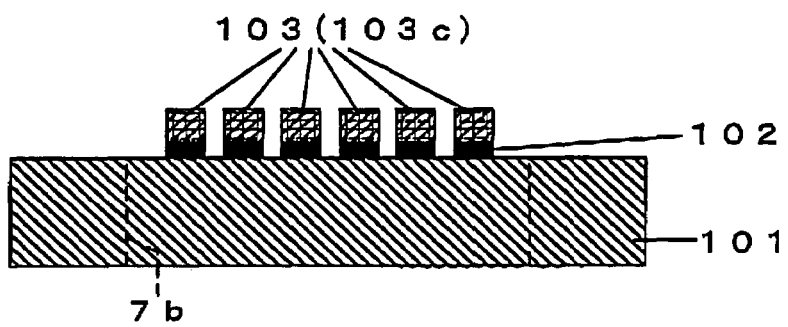
Figure 16D:
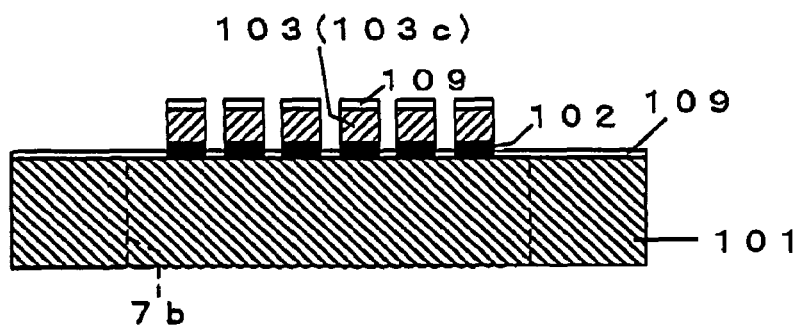
Figure 22:
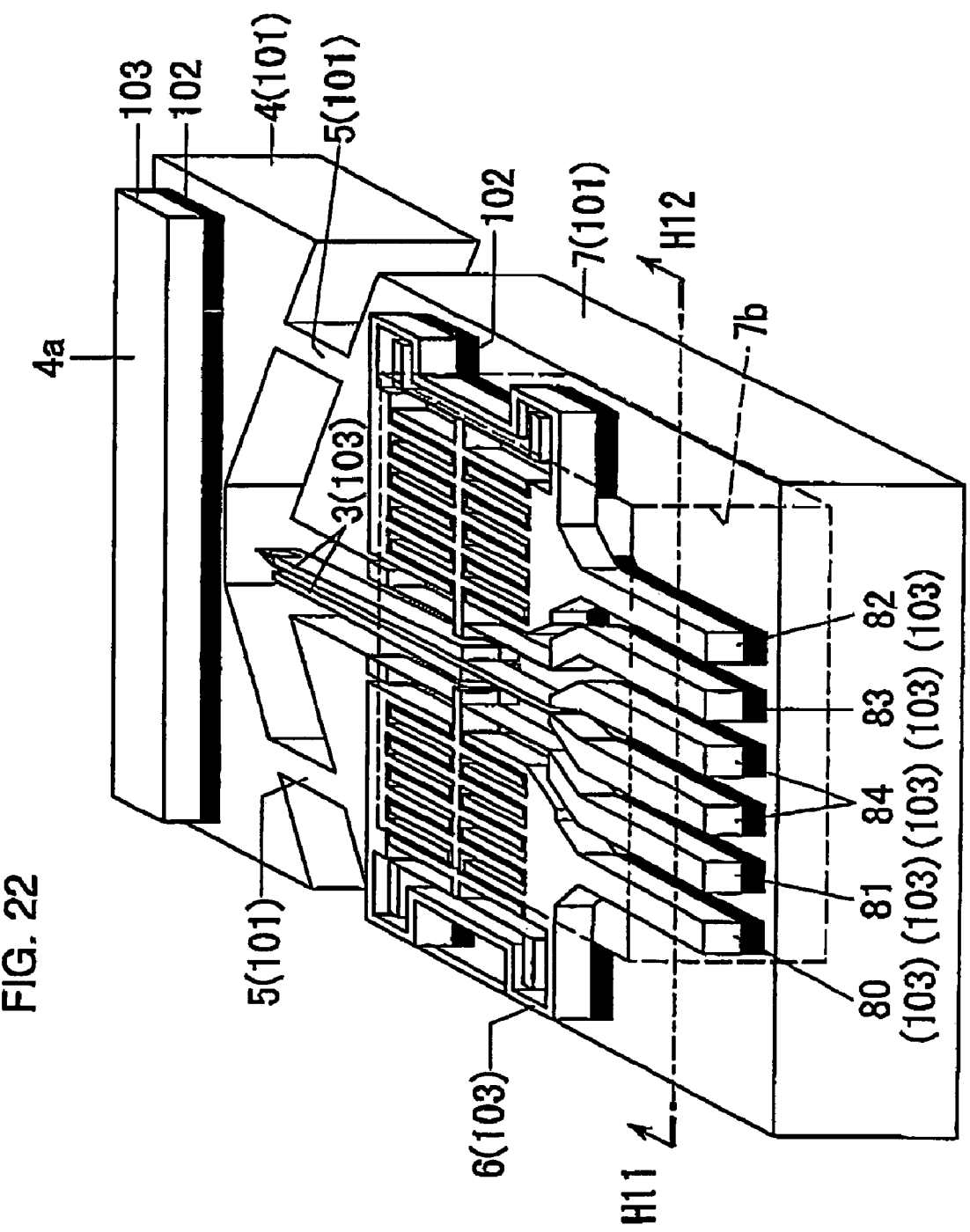
FIG. 22 shows the front surface side of the base layer in FIG. 16C.

FIG. 22 is a perspective of the front surface side of the base layer 101 and FIG. 16C is a sectional view taken along H11-H12 in FIG. 22. The insulating layer 102 is present between the electrode portions 103 and the base portion 101. Subsequently, a conductive film 109 constituted of aluminum or the like is formed through vacuum deposition or the like over the exposed base layer 101 and also over the silicon layer 103 constituting the individual components. The conductive film 109 should be formed to achieve a thickness equal to or less than 500 nm. While the production of the nanogripper device 2 in FIG. 1 is thus completed, additional processing may be executed on the grip portions 3a with a machining device such as an FIB.

The present invention is not limited to the embodiment described above. For instance, data indicating a correlation between a distance between the pair of arms and the voltage applied to the electrostatic actuator are stored in memory in the storage circuit 93 in advance, and the dimensions of the sample is detected based upon the applied voltage when the sample has become gripped and the data indicating the correlation which are stored in memory. However, data indicating a correlation between a distance between the pair of arms and the electrostatic capacity at the electrostatic actuator may be stored in memory in the storage circuit 93 in advance, and the dimensions of the sample may be detected based upon the electrostatic capacity when the sample has become gripped and the data indicating the correlation which are stored in memory.

While the hold on the sample Sa is detected and the dimensions of the sample Sa are measured by detecting the electrostatic capacity Ca at the drive mechanism 6 constituting electrostatic actuators in the embodiment described above, the hold detection and the gripping force measurement may be executed by applying the voltage from a DC source 621 to the conductive film 109 formed over the arms 3 and detecting a change occurring in the electrostatic capacity at the arms 3, instead. In such a case, the drive unit 6 does not need to constitute an electrostatic actuator and may instead be a drive mechanism achieved by using piezoelectric elements or thermal expansion elements.

In addition, the oscillation circuit in FIG. 13 may include a quartz vibrator instead of the coil 22.

The disclosure of the following priority application is herein incorporated by reference:

Japanese Patent Application No. 2004-210567 filed Jul. 16, 2004.

What is claimed is:

1. A nanogripper device having a length measuring function, comprising:

a pair of arms that is opened and closed freely;

an electrostatic actuator that drives the pair of arms to open/close the arms;

a first physical quantity detection unit that detects an electrostatic capacity as a first physical quantity, the electrostatic capacity being correlated to a distance between the pair of arms, a second physical quantity detection unit that detects a voltage applied to the electrostatic actuator as a second physical quantity, a hold detection unit that detects that a sample has become gripped by detecting an inflection point of a curve which indicates a relation between the detected electrostatic capacity and the detected voltage applied to the electrostatic actuator, and a dimension calculation unit that calculates a dimension of the sample based upon one of the first and second physical quantities detected by the first and second physical quantity detection units when the hold detection unit detects that the sample has become gripped.

2. A nanogripper device having a length measuring function according to claim 1, further comprising:

a storage unit in which data indicating a correlation between the distance between the pair of arms and the electrostatic capacity are stored in memory in advance, wherein:

the dimension calculation unit calculates a dimension of the sample based upon the electrostatic capacity detected by the first physical quantity detection unit when the hold detection unit detects that the sample has become gripped and data indicating the correlation which are stored in the storage unit when the hold detection unit detects that the sample has become gripped.

3. A nanogripper device having a length measuring function according to claim 2, wherein:

the electrostatic actuator includes a pair of comb-shaped electrodes, and the first physical quantity detection unit detects the electrostatic capacity between the pair of comb-shaped electrodes.

4. A nanogripper device having a length measuring function according to claim 2, further comprising:

a storage unit in which a first correlation between a distance between the pair of arms and the electrostatic capacity and a second correlation between the voltage applied to the electrostatic actuator detected by the second physical quantity detection unit and the electrostatic capacity are stored in memory in advance; and a gripping force calculation unit that calculates a gripping force imparted by the pair of arms gripping the sample based upon the voltage applied to the electrostatic actuator, the electrostatic capacity detected by the first physical quantity detection unit, the first correlation and the second correlation.

5. A nanogripper device having a length measuring function according to claim 1, further comprising:

a storage unit in which data indicating a correlation between the distance between the pair of arms and the voltage applied to the electrostatic actuator are stored in memory in advance, wherein:

the dimension calculation unit calculates a dimension of the sample based upon the applied voltage detected by the second physical quantity detection unit when the hold detection unit detects that the sample has become gripped and the data indicating the correlation which are stored in the storage unit when the hold detection unit detects that the sample has become gripped.

6. A nanogripper device having a length measuring function according to claim 5, wherein:

the electrostatic actuator includes a pair of comb-shaped electrodes, and the first physical quantity detection unit detects the electrostatic capacity between the pair of comb-shaped electrodes.

7. A nanogripper device having a length measuring function according to claim 5, further comprising:

a storage unit in which a first correlation between a distance between the pair of arms and the electrostatic capacity and a second correlation between the voltage applied to the electrostatic actuator detected by the second physical quantity detection unit and the electrostatic capacity are stored in memory in advance; and a gripping force calculation unit that calculates a gripping force imparted by the pair of arms gripping the sample based upon the voltage applied to the electrostatic actuator, the electrostatic capacity detected by the first physical quantity detection unit, the first correlation and the second correlation.

8. A nanogripper device having a length measuring function according to claim 1, wherein:

the electrostatic actuator includes a pair of comb-shaped electrodes, and the first physical quantity detection unit detects the electrostatic capacity between the pair of comb-shaped electrodes.

9. A nanogripper device having a length measuring function according to claim 8, further comprising:

a storage unit in which a first correlation between a distance between the pair of arms and the electrostatic capacity and a second correlation between the voltage applied to the electrostatic actuator detected by the second physical quantity detection unit and the electrostatic capacity are stored in memory in advance; and a gripping force calculation unit that calculates a gripping force imparted by the pair of arms gripping the sample based upon the voltage applied to the electrostatic actuator, the electrostatic capacity detected by the first physical quantity detection unit, the first correlation and the second correlation.

10. A nanogripper device having a length measuring function according to claim 8, wherein:

the pair of arms and the electrostatic actuator are formed at a semiconductor substrate through a semiconductor silicon processing technology.

11. A nanogripper device having a length measuring function according to claim 10, wherein:

the pair of arms and the electrostatic actuator are linked via an insulating layer.

12. A nanogripper device having a length measuring function according to claim 1, further comprising:

a storage unit in which a first correlation between a distance between the pair of arms and the electrostatic capacity and a second correlation between the voltage applied to the electrostatic actuator and the electrostatic capacity are stored in memory in advance; and a gripping force calculation unit that calculates a gripping force imparted by the pair of arms gripping the sample based upon the voltage applied to the electrostatic actuator detected by the second physical quantity detection unit, the electrostatic capacity detected by the first physical quantity detection unit, the first correlation and the second correlation.

13. A nanogripper device having a length measuring function according to claim 1, wherein:
the pair of arms and the electrostatic actuator are formed at a semiconductor substrate through a semiconductor silicon processing technology.

14. A nanogripper device having a length measuring function according to claim 13, wherein:
the pair of arms and the electrostatic actuator are linked via an insulating layer.

15. A method of length measurement executed with a nanogripper device having a length measuring function and having a pair of arms that can be opened and closed freely and an electrostatic actuator that drives the pair of arms to open/close the arms, comprising:
detecting an electrostatic capacity as a first physical quantity, the electrostatic capacity being correlated to a distance between the pair of arms,
detecting a voltage applied to the electrostatic actuator as a second physical quantity,
detecting that a sample has become gripped by detecting an inflection point of a curve indicating a relation between the detected electrostatic capacity and the detected voltage applied to the electrostatic actuator, and
calculating a dimension of the sample based upon one of the first and second physical quantities detected when detecting that the sample has become gripped.

16. A method of length measurement executed with a nanogripper device having a length measuring function according to claim 15, wherein:
the electrostatic actuator includes a pair of comb-shaped electrodes, and
the electrostatic capacity between the pair of comb-shaped electrodes is detected as the first physical quantity.

17. A method of length measurement executed with a nanogripper device having a length measuring function according to claim 16, wherein the sample is a biological sample.

18. A method of length measurement executed with a nanogripper device having a length measuring function according to claim 15, wherein the sample is a biological sample.

19. A nanogripper device having a length measuring function, comprising:
a pair of arms that is opened and closed freely;
an electrostatic actuator that drives the pair of arms to either open or close the arms;
a first physical quantity detection unit that detects an electrostatic capacity as a first physical quantity, the electrostatic capacity being correlated to a distance between the pair of arms,
a second physical quantity detection unit that detects a voltage applied to the electrostatic actuator as a second physical quantity,
a contact detection unit that detects that outer side surfaces of the pair of arms contact with sidewalls of a measurement object by detecting an inflection point of a curve indicating a relation between the detected electrostatic capacity and the detected voltage applied to the electrostatic actuator while opening the pair of arms; and
a calculation unit that calculates a width between the sidewalls of the measurement object based upon one of the first and second physical quantities detected by the first and second physical quantity detection units when the contact detection unit detects that the outer side surfaces of the pair of arms contact with the sidewalls.

20. A method of length measurement executed with a nanogripper device having a length measuring function and having a pair of arms that can be opened and closed freely and an electrostatic actuator that drives the pair of arms to open/close the arms, comprising:
detecting an electrostatic capacity as a first physical quantity, the electrostatic capacity being correlated to a distance between the pair of arms,
detecting a voltage applied to the electrostatic actuator as a second physical quantity,
detecting that the outer side surfaces of the pair of arms contact with sidewalls of a measurement object by detecting an inflection point of a curve indicating a relation between the detected electrostatic capacity and the detected voltage applied to the electrostatic actuator while opening the pair of arms, and
calculating a width between the sidewalls of the measurement object based upon one of the first and second physical quantities detected by the first and second physical quantity detection units when detecting that the outer side surfaces of the pair of arms contact with the sidewalls.

* * * * *